United States Patent
Gardner et al.

(10) Patent No.: US 12,008,332 B1
(45) Date of Patent: Jun. 11, 2024

(54) SYSTEMS FOR CONTROLLABLE SUMMARIZATION OF CONTENT

(71) Applicant: Anzer, Inc., Scottsdale, AZ (US)

(72) Inventors: Richard Gardner, Scottsdale, AZ (US); John Jozwiak, Cave Creek, AZ (US)

(73) Assignee: Anzer, Inc., Scottsdale, AZ (US)

( * ) Notice: Subject to any disclaimer, the term of this patent is extended or adjusted under 35 U.S.C. 154(b) by 0 days.

(21) Appl. No.: 18/452,496

(22) Filed: Aug. 18, 2023

(51) Int. Cl.
    G06F 40/56 (2020.01)
    G06F 16/34 (2019.01)

(52) U.S. Cl.
    CPC ............ *G06F 40/56* (2020.01); *G06F 16/345* (2019.01)

(58) Field of Classification Search
    CPC .................................................... G06F 40/56
    USPC ................................................................ 704/9
    See application file for complete search history.

(56) References Cited

U.S. PATENT DOCUMENTS

| | | | |
|---|---|---|---|
| 11,663,404 B2 | 5/2023 | Wang et al. | |
| 11,769,017 B1 | 9/2023 | Gray et al. | |
| 2013/0014169 A1* | 1/2013 | Sansom | G06F 16/735 725/48 |
| 2019/0114308 A1* | 4/2019 | Hancock | G06F 40/18 |
| 2020/0250223 A1* | 8/2020 | Gultekin | G06F 16/583 |
| 2021/0084145 A1 | 3/2021 | Pham et al. | |
| 2021/0326646 A1* | 10/2021 | Gultekin | G06V 10/82 |
| 2022/0391591 A1 | 12/2022 | Ronen et al. | |
| 2023/0252244 A1* | 8/2023 | Yang | G06N 20/00 704/9 |
| 2023/0367960 A1 | 11/2023 | Smus et al. | |
| 2023/0419051 A1 | 12/2023 | Sabapathy et al. | |

FOREIGN PATENT DOCUMENTS

| | | |
|---|---|---|
| CN | 107526718 A | 12/2017 |
| CN | 109657053 A | 4/2019 |
| CN | 110188349 A | 8/2019 |
| CN | 110807312 A | 2/2020 |

(Continued)

OTHER PUBLICATIONS

How Can Large Language Models Help Humans in Design And Manufacturing? Liane Makatura et al., Michael Foshey (Year: 2023) (Year: 2023).*

(Continued)

*Primary Examiner* — Bharatkumar S Shah
(74) *Attorney, Agent, or Firm* — Schwegman Lundberg & Woessner, P.A.

(57) ABSTRACT

A method of generating summaries of content items using one or more large language models (LLMs) is disclosed. A first content item is identified. The first content item includes a set of sub-content items. A level of abstraction is determined for the content item. A prompt is automatically engineered for providing to the one or more LLMs. The prompt includes a reference to the first content item and the level of the abstraction for the first content item. A response to the prompt is received from the LLM. The response includes a second content item. The second content item includes a representation of the first content item that is generated by the LLM. The representation omits or simplifies one or more of the set of sub-content items based on the level of abstraction. The representation is used to control an output that is communicated to a target device.

20 Claims, 15 Drawing Sheets

(56) References Cited

FOREIGN PATENT DOCUMENTS

| | | |
|---|---|---|
| CN | 112507711 A | 3/2021 |
| CN | 113822514 A | 12/2021 |
| CN | 113918708 A | 1/2022 |
| WO | WO-2023220198 A1 | 11/2023 |

OTHER PUBLICATIONS

Genesys, "How Generative AI is used in Genesys Agent Assist", Retrieved Online. URL: <https://developer.genesys.cloud/blog/2023-05-08-generative-AI-in-agent-assist/>, (May 8, 2023), 3 pgs.

Munro, Jillian, et al., "Effortlessly Summarize Phone Conversations with AmazonChime SDK Call Analytics: Step-by-Step Guide", Retrieved online. URL: <https://aws.amazon.com/blogs/business-productivity/effortlessly-summarize-phone-conversations-with-amazon-chime-sdk-call-analytics-step-by-step-guide/>, (Jun. 26, 2023), 6 pgs.

Suleiman, Dima, et al., "Deep Learning Based Abstractive Text Summarization: Approaches, Datasets, Evaluation Measures, and Challenges", Mathematical Problems in Engineering, vol. 2020, Article ID 9365340, (Aug. 24, 2020), 29 pgs.

Wiens, Vitalis, et al., "Semantic Zooming for Ontology Graph Visualizations", K-CAP '17: Proceedings of the 9th Knowledge Capture Conference, Article No. 4, (Dec. 2017), 8 pgs.

\* cited by examiner

SYSTEMS FOR CONTROLLABLE SUMMARIZATION OF CONTENT

TECHNICAL FIELD

The present application relates to artificial intelligence and machine learning systems, and, more specifically, to systems and methods for summarization of content using large language models in a controlled and configurable manner.

BACKGROUND

In recent years, artificial intelligence (AI) and machine learning (ML) technologies have advanced rapidly, leading to innovations in understanding and generating natural language content. Specifically, large neural network models called large language models (LLMs) have demonstrated impressive capabilities in language comprehension and text generation. LLMs such as GPT-3, Codex, and others can produce remarkably human-like text for a variety of applications.

BRIEF DESCRIPTION OF THE DRAWINGS

Some embodiments are illustrated by way of example and not limitation in the figures of the accompanying drawings.

DETAILED DESCRIPTION

Figure 1:
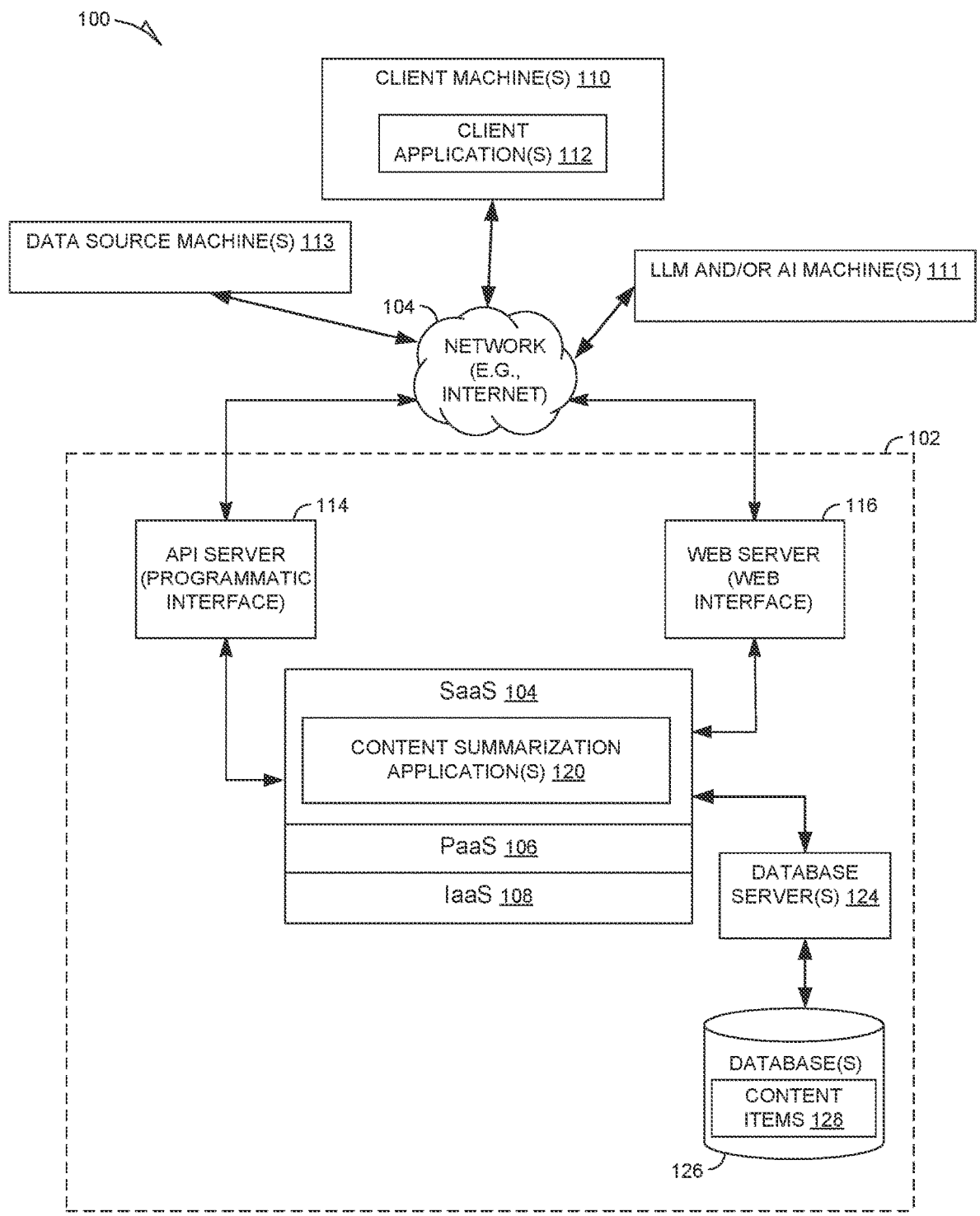
FIG. 1 is a network diagram depicting a cloud-based SaaS system within which various example embodiments may be deployed.

In the following description, for purposes of explanation, numerous specific details are set forth to provide an understanding of various embodiments of the present subject matter. It will be evident, however, to those skilled in the art that various embodiments may be practiced without these specific details.

Effectively leveraging LLMs for summarizing lengthy or complex content into more concise representations remains a significant technological challenge. A core technical problem is controlling the level of abstraction and brevity when generating abstractive summaries. Existing approaches lack sufficient precision and user configurability over summarization depth. Furthermore, iteratively refining summaries by providing initial representations back into the LLM for additional abstraction poses difficulties. Current systems also fail to preserve key data when condensing content.

The present disclosure provides specific technological solutions to these problems through one or more described features or combinations of features. The disclosed system enables users to precisely define a target level of abstraction (e.g., by specifying a percentage of length reduction) for a representation of a summary of a content item. For example, the system gives granular control over depth and brevity. The system may also be configured to engineer iterative prompts to have the LLM summarize its own prior outputs at increasing levels of abstraction. This allows for gradual refinement while preserving substantive information.

From a technical perspective, the innovations improve abstraction capabilities, provide configurable brevity, enable iterative summarization, and maintain data integrity—advancing the state of the art. The improvements are rooted in specific technical aspects, including prompt engineering techniques, abstraction level control parameters, iterative LLM processing, and data retention during summarization.

This disclosure has particular technical significance given the challenges of summarization. Reducing information quantity while retaining quality is difficult, and pushing the boundaries of abstraction involves employing nuanced AI/ML solutions. The disclosed techniques leverage the representational capabilities of LLMs in a novel manner to achieve higher levels of controllable abstraction.

The technical advancements will provide widespread utility across information-intensive domains including legal, academic, corporate, and government environments. By improving human-computer interaction around content summarization, the innovations also carry significance for accessibility and internationalization. The disclosed techniques are applicable to international systems, advancing the technical field globally. The specific technical improvements will enable more effective human information processing, knowledge management, and data comprehension.

In example embodiments, a situational awareness assistant is configured to scale between extremes of noticing either a forest or trees, figuratively, where a forest is a semantically scaled out view of a dialog, and trees is the explicit dialog. Scale changes, zooming in and out, presumably would be mapped to user interface elements or controls (e.g., ctrl +/−or cmd +/−, for keyboard equipped devices, finger pinch for touchscreens, voice for voice interfaces, and so on).

Negative zoom scale causes the system to infer from text that may be short, vague, or ambiguous, and the system may augment the dialog semantics with pertinent corelated external data source signals (market data, Crunchbase data, and so on). In example embodiments, negative zoom scales cause the system to make inferences and augment the summary with additional content. As the zoom percentage becomes more negative, the amount of additional content increases proportionally. For example, at −10% zoom, 10% more content may be added. At −50% zoom, 50% more content may be added, and so on. In example embodiments, a maximum amount of additional content may be set (e.g., at a configurable size), such as at 100% of the original content size. In example embodiments, as the negative zoom increases, inferences made with less certainty may be added. For each inference, the system specifies a percentage confidence level (e.g., from 0% to 100%). Higher certainty inferences are added at lower zoom levels. In example embodiments, at higher negative zooms, more conjectural external data is incorporated, such as older news articles, loosely related research papers, or financial data from years prior less directly tied to the core content. In example embodiments, inferences and external data, and/or their confidence levels, may be visually set apart and/or identified (e.g., using formatting like italics, color coding, icons, or labeling), allowing consumers to readily distinguish and/or evaluate the additional content.

In example embodiments, the system is configured to preserve important information across semantics-preserving scales. For example, only an amount of non-substantive and non-actionable information is reduced across scales during zooming. The system may provide a hint (e.g., audio or visual) that information has been reduced in a zoomed view, such as via a user interface or API notification.

This scaling is not only for chat dialogs, but also for any sequence of multiple participants over varied media types, including text dialogs, document sequences, web pages, including their revisions or unrelated trajectories, and so on. As an example, a text dialog may contain 1 person's notes (to oneself), two parties conducting a conversation, or multiple parties.

The tooling of Large Language Models (LLMs) is pertinent for text chats, and other large model vector databases and models may be used in other media sequence analyses.

If a Large Language Model such as ChatGPT is used, it would be instructed to not remove important information when summarizing, by composing or engineering a proper ChatGPT prompt, for example.

In example embodiments, a negative zoom may cause folding in of data from a constellation of continuously updated external signals to deliver composite semantics that are more clear than alone present in the dialog.

In example embodiments, the gist of the idea is semantic scaling of language-model-driven continuous-situational awareness, which could be useful in various contexts, as described in more detail herein.

A method of generating abstractive summaries of content items using one or more large language models (LLMs) is disclosed. A first content item is identified. The first content item includes a set of sub-content items. A level of abstraction is determined for the content item. A prompt is automatically engineered for providing to the one or more LLMs. The prompt includes a reference to the first content item and the level of the abstraction for the first content item. A response to the prompt is received from the LLM. The response includes a second content item. The second content item includes a representation of the first content item that is generated by the LLM. The representation omits or simplifies one or more of the set of sub-content items based on the level of abstraction. The representation is used to control an output that is communicated to a target device.

The described summarization techniques can provide utility across content types including legal documents, academic papers, medical records, and news articles. Condensing these often lengthy and complex documents into more concise overviews can improve comprehension and accessibility.

This techniques described herein provide novel capabilities in leveraging large language models and other AI for controllable content summarization. In comparison to summarization techniques in the art, the disclosed techniques of engineering prompts with configurable abstraction parameters to control summarization by LLMs represents a substantive technical improvement. For example, existing systems lack adequate capabilities for precision control over abstraction depth and brevity when generating summaries using large neural network models. They also fail to retain key data when condensing content. The disclosed systems and techniques addresses those deficiencies through prompt engineering techniques, abstraction level configuration, iterative LLM processing, data retention during summarization, and so on, as described herein.

The system described herein differs from prior systems in techniques such as directly specifying target compression percentages and abstraction levels in prompts to LLMs and/or iteratively reformulating prompts based on previous outputs to gradually increase abstraction. No existing solutions employ similar methods for controlling the abstraction process.

The disclosed system also preserves salient entities and facts when summarizing, even at high compression rates. In contrast, previous approaches often lose key details when attempting deeper abstraction. The system's data retention safeguards substantive information integrity.

In example embodiments, the system leverages machine learning techniques to optimize prompt engineering for precision abstraction control. The prompts provided to the large language models contain content-specific instructions designed to elicit the desired level of summarization depth and brevity from the models.

The system is pre-trained on a large dataset of {content, prompt, summary} triplets. The content comprises documents of various lengths and complexities. The prompts are engineered with different instructions, keywords, and text manipulation techniques to target different levels of abstraction. The summaries are human-generated at the target abstraction levels.

This training data enables the system to learn prompt engineering strategies tailored to different abstraction goals. Neural networks learn optimal prompt phrasing, text pre-processing like entity masking, and prompt structure to achieve the target compression rates.

For example, prompts requesting high abstraction may focus on dropping low-relevance sentences and emphasizing high-level themes. Prompts for low abstraction may specify including key details and statistics.

At runtime, the trained prompt engineering model dynamically constructs prompts customized to user-specified abstraction levels. Feedback loops continue refining prompts during usage by analyzing abstraction accuracy.

This machine learning approach allows controlling summarization depth and brevity with significantly higher precision compared to hard-coded rules or templates. The system has flexibility to tailor prompts to the nuances of specific content using learned prompt engineering strategies.

The system described herein provides substantive technical improvements over existing approaches to text summarization, such as in the areas of abstraction control, iterative refinement, and/or information retention. Further, rigorous quantitative and/or qualitative evaluations across datasets and metrics may be used to confirm the system's capabilities for high-fidelity, coherent, and configurable abstraction control, as described herein.

FIG. 1 is a network diagram depicting a system 100 within which various example embodiments may be deployed. A networked system 102, in the example form of a cloud computing service, such as Microsoft Azure or other cloud service, provides server-side functionality, via a network 104 (e.g., the Internet or Wide Area Network (WAN)) to one or more endpoints (e.g., client machines 110). FIG. 1 illustrates client application(s) 112 on the client machines 110. Examples of client application(s) 112 may include a content summarization application having controls for accessing content at different zoom levels, as described herein, an administration application (e.g., for configuring any of the configurable aspects of the content summarization application(s) 120 described herein), a web browser application, such as the Internet Explorer browser developed by Microsoft Corporation of Redmond, Washington, or other applications supported by an operating system of the device, such as applications supported by Windows, iOS or Android operating systems. Each of the client application(s) 112 may include a software application module (e.g., a plug-in, add-in, or macro) that adds a specific service or feature to the application.

An Application Programming Interface (API) server 114 and a web server 116 are coupled to, and provide programmatic and web interfaces respectively to, the content summarization services 120, which may be hosted on a software-as-a-service (SaaS) layer or platform 104. The SaaS platform may be part of a service-oriented architecture, being stacked upon a platform-as-a-service (PaaS) layer 106 which, may be, in turn, stacked upon a infrastructure-as-a-service (IaaS) layer 108 (e.g., in accordance with standards defined by the National Institute of Standards and Technology (NIST)).

While the content summarization applications 120 are shown in FIG. 1 to form part of the networked system 102, in alternative embodiments, the applications 120 may form part of a service that is separate and distinct from the networked system 102.

Further, while the system 100 shown in FIG. 1 employs a cloud-based architecture, various embodiments are, of course, not limited to such an architecture, and could equally well find application in a client-server, distributed, or peer-to-peer system, for example. The content summarization services 120 could also be implemented as standalone software programs.

Web applications executing on the client machine(s) 110 may access the content summarization services 120 via the web interface supported by the web server 116. Similarly, native applications executing on the client machine(s) 110 may access the services 120 via the programmatic interface provided by the API server 114.

The content summarization services 120 may be hosted on dedicated or shared server machines that are communicatively coupled to enable communications between servers. The services 120 themselves are communicatively coupled to each other and to various data sources, including the content items 128 stored in the database(s) 126 via the database servers 124.

Navigation of the content items 128 stored in the networked system 102 may be facilitated by one or more navigation applications. For example, a search application may enable keyword searches of the content items 128. A browser application may allow users to browse the content items 128 according to attributes stored as metadata.

In some embodiments, when the content summarization services 120 are operating in an inference mode, such as when a maximum abstractness threshold is exceeded, the services 120 may access external systems and data sources. For example, as illustrated in FIG. 1, external data stores 130 containing supplemental information may be accessed via network 104. These external data stores 130 may include knowledge bases, ontologies, public and proprietary databases, and other structured data. Example external data items include dictionaries, thesauruses, industry-specific taxonomies, company and product databases, maps, academic paper repositories, legal document collections, and financial data. By leveraging these external data items in inference mode, the content summarization services 120 can enrich the representation of the content items 128 to include additional contextual details and derived knowledge. This allows the services 120 to generate abstractive summaries that go beyond the information directly contained within the content items 128.

The content summarization application(s) 120 may be connected to one or more LLM or other artificial intelligence machine(s) 111. A large language model is a deep neural network trained on massive text datasets to predict probable next words given sequence of previous words. LLMs like GPT-3 contain billions of parameters and are trained using self-supervised learning on internet-scale corpora.

The architecture may include transformer blocks with attention mechanisms to model context and identify relevant patterns across the entire input sequence. The attention weights and feedforward layers may transform the input embeddings into higher level contextual representations used to make the word predictions.

During training, the model may input each text snippet sequentially and may try to predict the next word using its current internal representations. The weights may be updated through backpropagation to minimize the prediction loss across the entire corpus.

Over many iterations through the huge dataset, the network learns complex statistical relationships and nuances of natural language to build a robust internal representation of linguistic context, grammar, meaning, and fluency.

The trained model can generate coherent, human-like text by iteratively sampling from its predicted next word distributions to continue growing new sequences. Temperature parameters control randomness versus determinism in sampling.

LLMs like GPT-3 expose their generative capabilities through APIs that allow sending a text prompt and receiving back model-generated completions. The prompts can provide context and specify desired attributes of the output text.

The system may be configured to integrate with an LLM API by programmatically constructing prompts designed to produce summaries with the appropriate length, abstraction level, inferences, data integration, etc. (e.g., based on the zoom parameters).

The prompts can include the original text to summarize along with instructions tailored to elicit the target summary characteristics from the LLM. The system sends the prompts through the API and ingests the LLM-generated summaries to present to the user.

Over time, the system can learn how different prompts impact the LLM behavior (e.g., via training on prompt-summary pairs). This allows for automatic generation of optimal prompts for each summarization task.

The system may be configured to leverage multiple LLMs with different capabilities and may use orchestration mechanisms to combine outputs. The prompts and APIs enable seamlessly integrating LLMs into the summarization workflow.

In addition to large language models (LLMs), the system can leverage other types of AI to enhance the capabilities.

Extractive summarization models can identify and extract the most salient sentences or phrases from the original text to produce abridged summaries. These models may be trained on text-summary pairs to learn to rank sentences based on importance. These models may use encoder-decoder architectures, converting sentences to vector representations and scoring for relevance. The system can be configured to use extractive summarization models to, for example, concatenate extracted snippets into summaries meeting length constraints.

Abstractive summarization models may generate new phrases and sentences to compress meaning rather than directly extracting. They may be trained to paraphrase and generalize concepts using seq2seq architectures. The system can be configured to use abstractive summarization models to, for example, generate more fluent natural language summaries compared to extractive approaches.

Question answering (QA) models can answer specific information needs about the text. They may be trained to ingest passages and questions and output short excerpt answers. QA pairs may be used for supervision. Cascade transformer architectures may process the interactions between the passage, question, and answer. The system can be configured to use QA models to enrich summaries with requested details.

Data retrieval models can find and integrate relevant external data sources. These models may leverage inverted indexes, dense retrievers like DPR, and knowledge graphs to identify contextual data. The system can be configured to used data retrieval models to provide supplementary information to augment the summaries with outside facts and context beyond the original text.

Classification models can categorize the text subjects for topical filtering and abstraction. Text classifiers may be trained on labeled document corpuses to predict categories and tags. The system may be configured to use classifiers to orient summaries to key topical facets.

Sentiment analysis models determine emotional tone and opinions. They employ techniques like textblob polarity scoring and VADER sentiment lexicon matching. The system can be configured to use sentiment analysis models to, for example, customize summary perspectives and attitudes.

To integrate these other AI models, the system can employ similar training loops and prompting techniques as described for LLMs. The models expose prediction APIs for interfacing.

The system can construct prompts tailored to each model's capabilities and combine outputs for an ensemble summarization approach. The prompts provide the text along with instructions designed to elicit the desired analysis from each model.

For example, a single prompt could provide the text to the LLM for overall summarization, ask QA models for key details, have classifiers tag topics, retrievers augment with external data, and sentiment analysis score tone.

The system coordinates the information flow across the different models and consolidates their outputs into comprehensive summaries meeting specified parameters.

Over time, the system can learn how to optimally prompt each model and assemble ensemble summaries. The modular, pluggable architecture enables flexibly integrating a diverse set of AI capabilities beyond just LLMs to enhance the summarization functionality.

The prompts and APIs abstract the underlying model implementations, allowing the system to orchestrate and leverage an evolving ensemble of AI technologies as new models emerge. The system's model-agnostic approach facilitates experimentation and optimization to determine the best combination of models and prompts for each summarization task.

Data source machine(s) 113 may provide data usable by various components of the system. The large language models and other AI models integrated into the system can leverage diverse structured and unstructured data sources for training and inference needs.

For pre-training the foundation models that the system builds upon, huge corpora of text and other data may be used. This can include web crawl data, digitized books, Wikipedia, news archives, social media posts, discussion forums, and other textual content extracted from websites and applications. The pre-training data may cover a wide range of topics, styles, and genres to develop versatile language capabilities.

During further training and fine-tuning of the models for the summarization task, curated datasets of document-summary pairs in the target domain can be used. These provide examples for training the models to produce summaries with the appropriate length, perspective, and/or other attributes.

For accessing external knowledge to augment summaries, structured data sources like knowledge graphs, databases, and API-accessible web services can provide relevant facts and context. These can include general knowledge bases like Wikidata as well as domain-specific data repositories. The prompts can specify targeted data needs and sources to integrate.

Unstructured data can also provide supplementary training and inference information. For example, relevant news articles, financial reports, legal documents, and scientific papers can give useful in-domain information. Pre-trained semantic search engines can help identify contextual text passages for a given topic.

Within the system itself, aggregated behavioral data from user interactions can also be leveraged as a feedback signal for ongoing training. This can include data on which summaries users find most helpful, edits they make, zoom levels used, and other actions reflecting subjective preferences.

Capturing and analyzing patterns in how real users interact with the system provides personalized data for tuning the models to each user's needs. The models can learn to tailor prose style, perspective, inferences, and external data integration accordingly.

To access the diverse data sources, the system can leverage web crawlers, APIs, database integrations, and pre-built repositories. The data may be stored in cloud storage, data warehouses, and purpose-built collections optimized for machine learning.

The prompts provide a flexible mechanism for specifying dynamic data needs for each summarization task. The modularity of the system design allows expanding the data sources over time to improve model capabilities and training.

Figure 2:
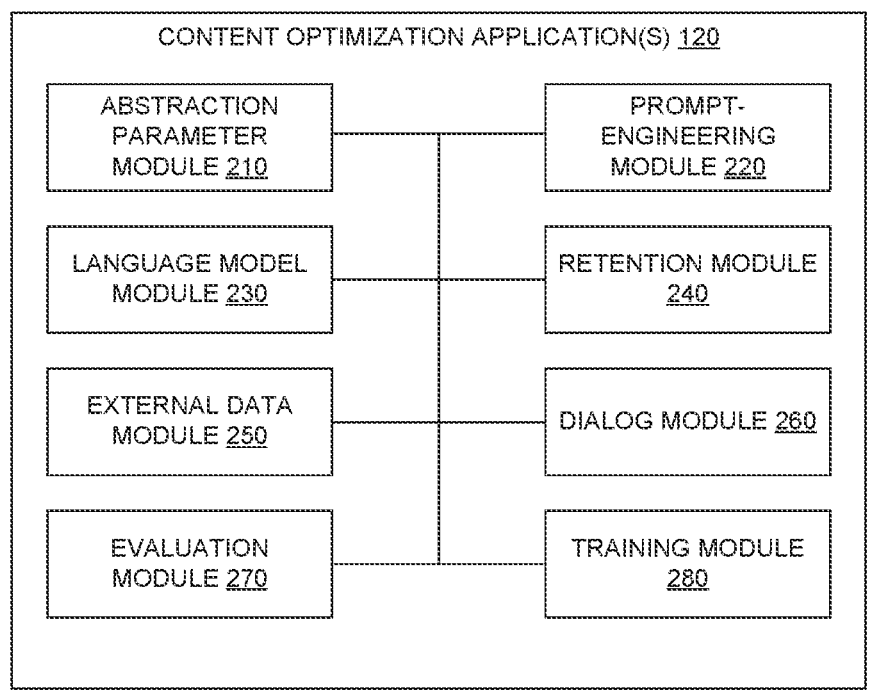
FIG. 2 is a block diagram illustrating example modules of the content summarization services and/or applications of FIG. 1.

FIG. 2 is a block diagram illustrating example modules of the content summarization service(s) 120.

The abstraction parameter module 210 enables configuration of abstraction parameters, such as a target compression percentage, via APIs or user interfaces to control the depth of summarization. The abstraction parameter module 210 may be configured to allow users to precisely define a target abstraction level, such as by selecting a specific compression percentage between 0-100%. The module 210 provides interfaces allowing users to numerically set the percentage of length reduction or manually choose from pre-defined abstraction levels (e.g., high, medium, low). Default percentages may be set for different use cases.

The prompt engineering module 220 may be configured to construct prompts for the language model 230 using the original content. In one embodiment, the prompts are iteratively reformulated based on previous outputs to increase abstraction. In an alternative embodiment, the original content is provided as input with different abstraction parameters without relying on previous outputs. The prompt engineering module 220 may be configured to employ various techniques to construct prompts customized for different LLMs 230. These techniques may include sentence reordering to improve coherence, replacing named entities with placeholders to control abstraction, inserting keywords and example outputs to guide the LLM, and providing instructions specifying the target abstraction level.

The language model module 230 may include or facilitate access to one or more pre-trained language models to generate abstractive summaries. The one or more models can be used out-of-the-box or optionally fine-tuned on domain-specific data.

The retention module 240 preserves key data and concepts from the original content during summarization.

The external data module 250 interfaces with external systems and data stores to supplement content during inference mode when abstraction thresholds are exceeded.

The dialog module 260 leverages the summarization capabilities to guide intelligent agent conversations via APIs.

The evaluation module 270 analyzes summarization outputs using metrics like compression rate, fidelity, coherence, and redundancy. The metrics and example outputs may be surfaced via APIs and user interfaces for monitoring and refinement of the summarization process.

In operation, abstraction parameters can be configured via the abstraction parameter module 210 based on user or system requirements. The prompt engineering module 220 constructs prompts customized for different language models 230. Summaries are iteratively produced while preserving key information and supplementing with external data when needed. Metrics from the evaluation module 270 help guide ongoing improvements to the summarization process. The evaluation module 270 may be configured to analyze summarization outputs using metrics including compression rate, coherence, fidelity, and redundancy. Compression rate measures the reduction in length between the original and summarized content. Coherence measures how logical and well-structured the summary is. Fidelity measures how accurately the summary captures the key points. Redundancy measures repetitive or unnecessary phrases.

The training module 280 enables fine-tuning or training of the language models 230 on custom datasets relevant to the summarization task and domain. While not required, additional training can improve performance by adapting the models to the terminology, writing style, and abstraction levels preferred for the target use case. For example, legal summarization may benefit from models fine-tuned on legal documents to better handle long, complex content with precise definitions and citations. The training module 280 may be configured to fine-tune language models 230 on domain-specific datasets. Data preprocessing may include techniques like formatting, cleaning, and sampling representative content. Various model architectures like BERT or GPT-3 may be used for abstractive summarization. Models may be trained using maximum likelihood estimation and backpropagation to optimize abstraction performance.

In operation, pre-trained or fine-tuned language models 230 are leveraged to produce summaries. The training module 280 can be used to customize models 230 when beneficial, otherwise off-the-shelf models may be used directly. For example, the BERT model may be fine-tuned on a large corpus of legal documents to adapt it to the vocabulary, writing style, and abstraction levels commonly used for summarizing legal contracts and/or GPT-3 may be fine-tuned on technical papers in a specific field like biomedicine to help summarize lengthy academic documents into concise abstracts using common terminology.

Several training techniques and processes may be employed to optimize the large language models (LLMs) used for summarization. The models can be pre-trained on massive text corpora then fine-tuned on domain-specific datasets.

For pre-training, billions of text documents are utilized to develop general language understanding. Data sources include web pages, books, academic papers, news articles, forums, and more. Documents are diversity-filtered to improve coverage of topics, writing styles, and terminology. Cleaning, shuffling, and sampling techniques prepare the pre-training data.

After pre-training, the LLM can be fine-tuned on a dataset of document-summary pairs in the target domain. For legal summarization, thousands of contracts, cases, and filings with human-written abstracts provide examples for specialization. Data cleaning prepares the domain documents.

During fine-tuning, the model may be trained to generate summaries similar to the examples using maximum likelihood estimation and backpropagation. Hyperparameters like learning rate, dropout, and epochs may be optimized for the dataset. Augmentation techniques like paraphrasing may be used to expand the training set. The optimized model architecture may be selected by evaluating on a holdout set.

Quantitative evaluation metrics may measure key attributes of the generated summaries, such as, for example:

Compression Rate—the reduction in length from the original text to the summary. A higher rate indicates more abstraction.

Fidelity—semantic similarity metrics like ROUGE, BLEU, and METEOR compare reference summaries to system outputs by n-gram overlap. Higher scores indicate better alignment with human references.

Coherence—readability metrics like Flesch ease-of-reading assess grammar, structure, and clarity. Higher scores reflect more coherent summaries.

Information Density—the ratio of key details like entities, facts, and figures to filler words. Higher density focuses summaries on substantive content.

Redundancy—repetition analysis flags reused phrases and overlapping semantic content. Lower redundancy improves conciseness.

Relevance—human ratings or automated classifiers judge how well the summary captures pertinent information from the source. Higher relevance improves utility.

These metrics may be logged for each generated summary and tracked over time. The metrics may guide ongoing model optimization and training priorities.

Many external data sources can provide contextual information to augment summaries:

Knowledge Bases: Wikidata, DBpedia, and proprietary knowledge graphs contain entities, relationships, and facts to add background;

Academic Resources: Paper repositories (arXiv, JSTOR), patent databases, and research catalogues supply scientific context;

News & Current Events: News APIs, public data sets, and web scrapers offer timely, real-world context;

Financial Data: EDGAR filings, company profiles, macroeconomic indicators, and market data provide business context;

Public Records: Legal documents, property records, voter info, census data etc. contribute governmental context;

Product Data: Manufacturer databases, ecommerce catalogs, and review sites give product/service context; and/or User Analytics: CRM systems, sales funnels, web analytics, and other behavioral data tailor summaries to user needs.

The system may index these sources for efficient lookup based on, for example, entity linking, keywords, and semantic search to find the most relevant external data for a given summarization. Access may be controlled to prevent data abuse. Summarized excerpts may keep external data concise.

In example embodiments, summaries can be tailored to different use cases through customized vocabulary, style, length, and formatting; for example:

Executives get bulleted overviews with simple vocabulary;

Legal professionals receive legalese summaries with key citations preserved;

Doctors get medically accurate summaries of health records with jargon explained;

Engineers get technically precise summaries with math/code formatted properly;

Children get summaries written at lower reading levels using simpler words;

Blind users get text-to-speech converted summaries;

Foreign users get summaries translated to their native language;

Analysis use cases optimize vocabulary and length for easy skimming;

Reporting use cases format nicely with fonts, colors, and data visualizations;

Compliance use cases redact or mask sensitive information; and/or

Profiles with user role, reading level, language, accessibility needs, and purpose guide customization. In example embodiments, summaries are adapted to improve understanding and utility for target audiences.

Detailed analytics track system usage and performance; for example:

Request volumes, response times, and traffic trends identify capacity needs;

Query latency percentiles pinpoint bottlenecks;

Memory usage, CPU, and storage help optimize infrastructure;

Error rates, failures, and alerts highlight reliability issues;

Model prediction load, data API usage, and training times guide optimization;

Summary ratings measure quality and satisfaction;

Usage patterns analyze common documents, entities, keywords, and queries.

Analytics may be visualized on dashboards for monitoring. Anomaly detection triggers alerts. Data guides infrastructure planning and system improvements.

The described design balances tradeoffs like accuracy, flexibility, scalability, and transparency.

The summarization system may be optimized using a robust training methodology designed to maximize abstraction accuracy. The large language models at the core of the system may be pre-trained on massive text corpora to develop general linguistic capabilities. For example, the GPT-3 model may be pre-trained on over a trillion words.

After pre-training, the models may be fine-tuned on domain-specific summarization datasets to specialize them further. For example, for legal summarization, a large corpus of legal contracts, cases, and filings is used together with human-written abstracts. Similarly, for scientific documents, a large dataset of academic papers paired with abstracts is leveraged.

The training data may be prepared through cleaning, formatting, and normalization. Augmentation techniques like backtranslation and paraphrasing may be used to increase the size of the datasets. Hyperparameters may control each training run, including learning rate, dropout, and number of epochs.

To evaluate the models after fine-tuning, the system may use summarization metrics like ROUGE and METEOR to quantify semantic similarity to reference summaries.

Human evaluation studies may be conducted where subject matter experts like lawyers and scientists rate summaries for accuracy, fluency, and completeness.

To benchmark our approach, controlled experiments may be conducted comparing the system against established summarization techniques, such as experiments on legal, academic, and news summarization datasets.

While some of the descriptions of the system herein focus on text summarization, the system architecture is designed to support multimedia inputs as well, including audio, images, and video.

For audio input such as podcasts, speeches, and phone calls, automated speech recognition may first be used to transcribe the audio to text. The resulting text transcript may then summarized using the system's text summarization capabilities. The system may employ optimized speech-to-text models that are fine-tuned on the target audio domains to maximize transcription accuracy.

For image and video inputs, multimedia analysis techniques may be applied to extract salient objects, people, scenes, and text segments from the visual content. This extracted visual metadata provides signals for determining importance and relevance when generating a summary. For example, key frames containing presenters, slides, or illustrations could be prioritized from video. The system's summarization models may be trained to incorporate both textual and visual relevance cues.

After extracting key textual and visual elements from multimedia, the system's summarization engine may condense this content (e.g., following the configurable abstraction techniques described herein). The system may generate multimedia summaries optimized for different modalities, such as spoken audio summaries, image storyboards, video highlight reels, and so on.

Thus, the system's summarization techniques may be applied beyond text (e.g., to rich multimedia use cases). In example embodiments, the same precision abstraction capabilities may be realized across images, video, audio, and other types of content.

Figure 3:
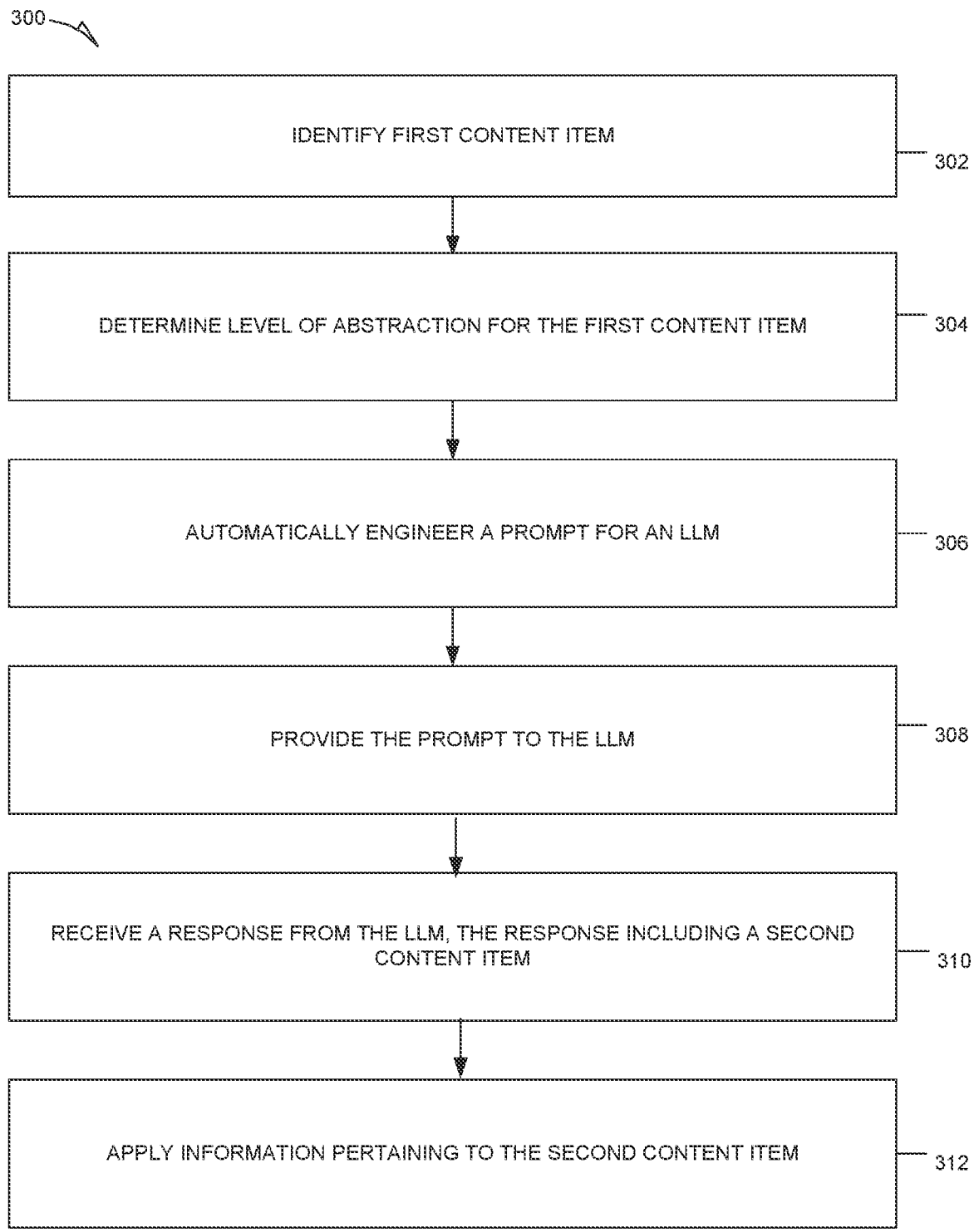
FIG. 3 is a block diagram illustrating an example method for generating abstractive summaries of content items using a large language model (LLM).

FIG. 3 is a block diagram depicting an example method 300 for generating abstractive summaries of content items using a large language model (LLM). In example embodiments, the method 300 may be implemented by one or more of the modules of FIG. 2.

At operation 302, a first content item is identified. The first content item may contain multiple sub-content items, such as sentences or passages. The first content item can be sourced in various ways, such as loading a document file, scraping a website, interfacing with a content repository via API, recording a phone call, transcribing a video, extracting text from images, etc. The content item may originate as text, or be extracted from sources including audio, video, books, legal documents, medical records, emails, webpages, chats, research papers, news articles, product descriptions, resumes/CVs, police documents, and more. For legal, medical, or other sensitive content, prompt engineering may instruct the LLM to not omit substantive information regardless of abstraction level.

Optical character recognition (OCR) may be used to extract text from image or video files. Speech recognition can transcribe audio to text. The content item may undergo pre-processing such as formatting, language detection, entity extraction, etc.

At operation 304, a level of abstraction is determined for the first content item. This determination may be based on user input or an API parameter specifying a compression percentage or other abstraction parameter. The target abstraction level may be specified numerically (e.g. 50% compression), using qualitative descriptors (high-level summary), or combining metrics like word count and percentage of named entities to remove. User interfaces, configuration files, or runtime parameters can define abstraction levels. Presets may exist for different use cases.

At operation 306, a prompt is automatically engineered for the LLM. In example embodiments, the prompt engineering applies techniques like sentence reordering, entity replacement, keyword insertion, example output framing, and instructions guiding the LLM to hit the abstraction targets. Templates can be defined for different content types. Prompts may be engineered programmatically or using simple interfaces.

For example, named entities like dates, dollar amounts, product names, etc. can be replaced with generic placeholders in the prompt to control the level of abstraction. The prompt may instruct the LLM to focus on summarizing the content themes rather than reproducing specific details. Additionally, the order of the sentences from the original content can be rearranged in the prompt to improve context and logical flow for the LLM. Templates may determine optimal sentence positioning based on relationships between entities, topics, and other semantic factors.

At operation 308, the prompt is provided to the LLM. The LLM can be implemented using machine learning frameworks like TensorFlow or PyTorch. It may run locally or leverage cloud APIs. Summarization occurs autonomously after prompt submission. Generated text in the response is extracted programmatically.

At operation 310, a response is received from the LLM. The response contains a second content item representing the first content item. The representation omits or simplifies sub-content items included in the first content item based on the abstraction level.

In example embodiments, if the abstraction level exceeds a threshold, the prompt is enhanced to request one or more inferences and or one more external data items. These requests may be used to enrich the representation. External data can provide supplementary information from sources like knowledge bases, corporate databases, or news APIs to substitute abstracted entities and details. This external data may help maintain coherence and accuracy when aggressively compressing content. External data may provide supplementary information from sources like knowledge bases, corporate databases, academic paper repositories, current events, product catalogs, user profiles, and criminal history records, and may be used to add to or as a substitute for abstracted details.

Operation 312, the representation is applied (e.g., used to control output communicated to a target device. Example target devices may include screens, speakers, haptic interfaces, augmented reality displays, etc. The representation may be converted to speech, displayed text, graphics, video, animations, or other formats. For a sales call, the representation may be used to engineer a conversational response for an intelligent agent. The response is contextually appropriate based on the call details. Conversational context factors like user profile, dialog history, and business/sales details can inform response generation along with the content representation. The system may leverage these contextual clues to craft natural, situationally-appropriate responses. The representation may be applied to generate visualizations, animations, conversational responses, or other outputs tailored for webpages, reports, emails, legal briefs, medical summaries, sales calls, books, and more.

In example embodiments, iterative prompt engineering guides the LLM to gradually increase abstraction levels. The process terminates when the representation satisfies metrics like length, entity density, lexical complexity, etc. compared to the source. Checkpoints can validate intermediate summaries. In example embodiments, if the abstraction level is −20%, the prompt may be engineered to request inferences with over 80% confidence and/or appropriate external sources. At −50% zoom, the prompt may be engineered to request inferences over 50% c confidence and/or related external data having a corresponding "looseness" of relation.

The system may employ advanced machine learning techniques to optimize prompt engineering for precision control over the abstraction capabilities of large language models (LLMs). On innovation is a prompt engineering model that is trained to dynamically construct prompts tailored to the nuances of the input content and desired level of abstraction.

In example embodiments, the prompt engineering model utilizes a transformer-based neural network architecture. It employs an encoder-decoder structure. The encoder ingests features extracted from the input content item, like part-of-speech tags, named entities, sentiment scores, topic vectors, and the target abstraction level. The decoder model generates an optimized prompt sequence conditioned on the encoder outputs.

During training, the model learns prompt engineering strategies that elicit the most accurate summarization from the LLM for each content type and abstraction level. The trained model can generalize these strategies to new documents.

The prompt engineering model may be trained on a diverse dataset of {content, prompt, summary} triplets. The content comprises text samples exhibiting a wide range of linguistic features and document structures. The prompts may be high-quality human-engineered examples written for different abstraction levels. The summaries may be human-generated by domain experts at each target abstraction level.

This provides supervised training data to learn associations between content characteristics, prompt structure, and desired summaries. Human-curated data ensures prompts achieve goals without undesirable biases.

The model may be trained end-to-end using maximum likelihood estimation. Cross-entropy loss is minimized between predicted prompts and human reference prompts. Training continues until convergence and overfitting is reduced through regularization techniques like dropout.

To expand the training set scale and diversity, data augmentation techniques like backtranslation, paraphrasing, and noising may be employed. This improves generalization capability.

The final trained model can predict optimal prompts for arbitrary new content items and target abstraction levels.

In addition to pre-training, online learning during inference continuously improves prompt engineering. User feedback like summary ratings and edits may provide a personalized training signal. User interactions may be logged as {content, prompt, summary, feedback} samples.

Periodically, new samples may be aggregated and used to retrain the prompt engineering model. This allows adapting to individual user styles and preferences.

Active learning selection strategies identify the most informative samples for retraining. This maximizes accuracy gains from limited user feedback.

To avoid disrupting users, new prompt engineering models may be evaluated offline first. Only models passing quality tests may be deployed (e.g., following a blue/green deployment paradigm).

In example embodiments, multi-task learning helps optimize prompts. Auxiliary tasks like predicting the ideal length or abstraction level for a document provide useful gradients during training. This may lead to better shared representations.

In the multi-task framework, the model shares encoder weights between tasks while maintaining task-specific decoders. The primary task predicts prompt text conditioned on the encoder. Secondary tasks predict properties like target length.

By modeling document-to-prompt and document-to-properties in parallel, the resulting encoder representation becomes specialized for prompt engineering.

This technique improves generalization by regularizing the model to capture attributes necessary for high-quality prompts beyond just mimicking human demonstrations.

In addition to supervised learning on human prompts, reinforcement learning (RL) may be used to further enhance prompt engineering.

In RL, an agent (the prompt engineering model) takes actions (generates prompts) in an environment (the LLM) to maximize a reward (the summarization accuracy). The model receives feedback on how well each prompt achieves the target abstraction level. It learns to improve prompts through trial-and-error.

The model may be initialized with weights pretrained on human prompts. RL fine-tunes prompts tailored to the nuances of the particular LLM model. Various policy gradient algorithms like REINFORCE are employed for training.

This allows adapting prompts to optimize abstraction control for individual LLMs. The RL agent learns intricacies of how different prompts influence each LLM's outputs.

In an interactive setting, human-AI collaboration can enhance prompt engineering. Users may provide feedback to a generative model, steering it towards higher quality prompts.

Humans possess intuitive understanding of nuanced language concepts difficult to capture through fixed rules and training data. Collaborative learning leverages human strengths.

Active learning queries select the most uncertain or informative prompts for human feedback. This minimizes the number of needed interactions.

Feedback modalities include rating prompts, choosing between prompt alternatives, editing prompts, and open-ended suggestions. This rich feedback targets model weaknesses.

The human collaborator essentially acts as an additional trainer providing personalized, contextual guidance to the prompt engineering model. This tight feedback loop rapidly improves prompts.

The trained prompt engineering models may deployed in a scalable cloud-based architecture optimized for low latency, as described herein.

Autoscaling groups may launch additional model servers based on load. This maintains fast response times under high request volumes.

Request batching with dynamic timeouts balances throughput and latency. Caching reduces prompt generation time for common content profiles.

The architecture integrates with the overall summarization workflow. Prompts are passed to downstream LLM services for summary generation after engineering.

This deployment maximizes availability and scalability of mission-critical prompt engineering functions. Reliable prompts drive overall summarization accuracy.

The trained models may employ diverse techniques to optimize prompts, including one or more of the following:

Content Reordering—Restructures long input text for better context and coherence. Improves LLM comprehension;

Entity Replacement—Substitutes non-critical entities with placeholders to control abstraction. Allows focusing LLM on key information;

Keyword Insertion—Inserts keywords like "summarize" and "paraphrase" to guide LLM behavior;

Example Output—Provides example desired outputs to establish formatting and voice, Length Constraints—Specifies target word, sentence or percentage limits to hit abstraction goals;

Reading Level—Adjusts vocabulary complexity and sentence structure based on user expertise. Makes summaries accessible;

Tone Adaptation—Tunes formality, professionalism, and enthusiasm of language to match user preferences, and/or Discourse Markers—Uses transition words and phrases to improve logical flow and coherence in generated summaries.

The appropriate techniques are selected and combined to construct prompts customized for the content attributes, abstraction level, use case, and user profile.

This expands the space of possible prompts exponentially. A learned model is crucial for identifying optimal prompt formulations.

To automatically assess prompt quality, various metrics may be employed, including one or more of the following:

Abstraction Accuracy—Compares target vs actual abstraction level achieved based on summary length, compression ratio, and information density;

Coherence—Assesses flow, transitions, and clarity using readability metrics like Flesch-Kincaid;

Conciseness—Measures brevity and redundancy using density metrics;

Relevance—Scores how well the prompt produces summaries containing pertinent details from the source content;

Fluency—Evaluates grammar, structure, and naturalness of generated summaries;

Diversity—Quantifies variety and novelty across prompts for the same document using n-gram difference, embedding distance, and other text dissimilarity measures; and/or User Ratings—Collects explicit feedback from users on 5-point Likert scales rating dimensions like relevance, coherence, and conciseness.

These metrics may guide ongoing prompt optimization and training priorities. Prompts are selected to maximize overall metrics.

This evaluation methodology ensures high-quality prompts tailored to each document and use case. Precise prompts drive precise summarization.

The system may train customized models to construct optimized prompts using neural networks, reinforcement learning, and human collaboration. These prompts dynamically guide LLMs to generate summaries with the desired abstraction level, length, structure, and style.

The system may utilize adjustable zoom levels, both positive and negative, to dynamically generate summaries of source content at varying levels of abstraction.

Positive zoom levels (e.g., ranging from 100% down to 0%) may allow condensing of the summary from fully restating the original content down to only the most critical elements. For example, at 100%, no abstraction is applied and the full content is restated verbatim. As the zoom level decreases towards 0%, less important details are incrementally dropped from the summary while key identities, structure, obligations, and terms are preserved. At very high abstraction levels nearing 0%, only the most essential data, such as a fundamental purpose, parties involved, duration, and core components of the content, are maintained in the summary.

Negative zoom levels (e.g., from 0% to −100%) allow expanding of the summary by incorporating additional inferences made about the content and/or relevant data form one or more internal or external data sources. For example, at 0% abstraction, no additional information may be added beyond restating the original content. But as the negative zoom level decreases, the system has license to make and include more complex inferences about the source information, such as, for example speculating on risks, motivations, or future implications that require deeper analysis. The system may also bring in progressively more granular external data from various sources to provide context, from high-level industry averages down to specific competitive intelligence on parties (e.g., companies or people) involved.

In example embodiments (e.g., based on configuration settings pertaining to the lengths or sizes of positive and/or negative responses), the positive and negative zoom scales can produce mirrored levels of abstraction, with a difference including that the negative scale extractions are supplemented with additional inferred insights, contextual data from external sources, and/or metadata like specificity and confidence ratings.

At their core, the positive and negative zoom abstractions may contain the same summarized content about the original data, just at varying levels of conciseness. For example, summaries at ±10%, ±20%, ±50% may all focus on the same key points, statistics, conclusions etc. from the source material.

However, while the positive scale provides just the core summarized content, the negative scale adds value through augmentation. So those same −10%, −20%, −50% summaries would include not just the distilled content but also more speculative inferences made by the system, relevant contextual data pulled from outside sources, and/or metadata to qualify the additional information.

For instance, a −10% summary may link key figures to related industry reports and characterize those as moderately confident augmentations. A −20% summary may make bolder speculative conclusions about motivations, while labeling those as low confidence inferences.

This mirrors the core positive summary content but enhances it with value-adding augmentation. The inclusion reasoning and confidence metadata further allows the user to interpret the value and reliability of the augmentations.

So in essence, the positive and negative scales may contain mirrored abstraction levels of the core content, but the negative side "zooms out" further by leveraging augmentation and metadata to add value on top of the core summaries. This allows for more enriched analysis without losing the option to still view just the core summarized content as needed.

The system may determine the relative importance of information in the original content using natural language processing techniques like word frequency analysis, sentiment analysis, named entity recognition, and more. It decides which inferences and external data to include based on relevance, using similarity measures like cosine similarity and heuristics to assess applicability. Confidence ratings may be provided with added inferences and data to indicate the speculative nature or certainty of each addition. The goal is to balance concise restatement of the core content with value-added inferences and data for context, without exceeding reasonable length constraints.

To achieve this functionality, the system may automatically generate prompts designed to produce a desired level of abstraction from the large language model (LLM) that generates the summaries. At high positive zoom levels, the prompt may instruct the LLM to restate the key elements of the content in a specific word limit, forcing extreme paraphrasing and abstraction. As the zoom level decreases, the word limit may be gradually relaxed. At the 0% neutral level, the prompt may tell the LLM to comprehensively summarize the content as concisely as possible. At negative levels, additional instructions are provided, for example: "Speculate on any risks or future implications you can infer from the content, with a confidence rating from 1-10." And "Bring in relevant industry data to provide context, citing your sources and confidence rating."

The system calculates appropriate word limits, abstraction levels, and instructions to generate prompts across the zoom level spectrum. It can optimize prompts through iterative testing and feedback. The prompts are designed to control the length, abstraction, inferences, data integration, and other attributes of the LLM-produced summaries.

During training, the system learns how different prompts impact the LLM behavior and summary quality at each zoom level. The training process may involve one or more of the following:

Programmatically generating a wide range of prompts for the LLM with varying instructions, abstraction levels, word limits, and other attributes;

Analyzing the LLM's output summaries to measure attributes like length, use of inferences, integration of external data, and conciseness;

Scoring summary quality through metrics like information coverage, coherence, readability, and human validation; and/or Using reinforcement learning to associate prompt attributes with summary outcomes to determine optimal prompts;

Through sufficient training data, the system learns how to automatically construct prompts tailored to each zoom level that will elicit the desired LLM behavior and high-quality summaries with the appropriate balance of abstraction, conciseness, inferences, data integration, and insight.

Additionally, for sensitive content like legal contracts or medical records, the system may identify and preserve especially important data even at very high levels of summarization. Techniques may include one or more of the following:

- Flagging certain data like names, dates, identifiers, obligations as high priority for retention during the natural language processing analysis of the source content;
- Maintaining a list of entities, terms, and data types that are typically essential for certain document types like contracts or patient records based on best practices:
- Providing explicit instructions in the prompts generated for the LLM to retain specific highlighted information in the summary, overriding the abstraction process;
- Programmatically checking generated summaries during training to ensure retention of flagged data, and providing feedback to the LLM on errors;
- Allowing users to tag certain data as mandatory to keep prior to summarization;
- Employing conditional logic in the prompts to preserve different data depending on document type, leveraging document classification techniques; and/or
- Generating multiple summary variations with and without the sensitive data to enable comparison.

Through these mechanisms, especially crucial data can be identified (e.g., via automation, user input, and/or domain intelligence). The system then ensures its retention irrespective of the zoom abstraction level through targeted prompt engineering and training. This balances concise summarization with preservation of information integrity for sensitive content.

Furthermore, the system can support real-time interaction and adjustment of zoom levels through user interface controls. Some example capabilities may include one or more of the following:

- Displaying the original content and summary side-by-side, synchronized scrolling, with UI controls like sliders, dials, or buttons to change the zoom level on-the-fly;
- Animated transitions when adjusting the zoom to show content being added or removed smoothly;
- Interactively expanding or collapsing sections of the summary to toggle between high-level overviews and more detailed restatements;
- Mouseover popups that reveal additional inferences or external data when hovering over parts of the summary;
- Visual confidence ratings and data source citations displayed directly in the summary interface;
- Natural language or conversational interfaces for modifying the zoom level using voice commands or text;
- Integration with screen readers, magnifiers, or other accessibility tools to accommodate different user needs;
- Real-time feedback mechanisms where users can validate or flag issues with inferences as they review the summary;
- Version history for the summaries allowing toggling between prior zoom levels to compare; and/or
- User-configured zoom level presets for common abstraction needs.

These interactive interfaces allow users to dynamically control and customize the summarization on demand to suit their real-time needs for consuming and understanding complex documents.

In addition, the system may be integrated with external systems via APIs to enable real-time abstraction and analysis of content. Some examples include the following:

- A sales automation platform querying the system to get high-level summaries of customer contracts on demand to facilitate deal discussions;
- A legal research system using the summarization to analyze case law and precedent documents to extract key arguments and concepts;
- A medical records system invoking the summarization to pull out critical information from patient reports into standardized, condensed formats for physician review;
- A financial modeling system calling the API to summarize lengthy filings or earnings transcripts in real-time to feed into valuation models;
- A marketing automation tool that uses the summarization to create condensed descriptions of products, services, or other content for campaigns;
- A recruiting system leveraging the summarization to create condensed, anonymized resume summaries for screening candidates; and/or
- An AI assistant or chatbot utilizing the summarization to digest long-form user queries or requests into condensed formats for improved comprehension.

The external systems can connect to the summarization API to submit documents, specify zoom levels, and receive generated summaries on demand for integration into downstream processes and applications. Real-time access enables them to leverage the summarization capabilities to extract key information, insights, and context to inform automated decisions and actions.

The system provides versatile functionality through its real-time zoom level controls, external system integration, and use cases that allow users and applications to dynamically customize summarization of complex documents to suit their specific needs and workflows.

For negative zoom levels, the prompts can be constructed to provide transparency into the reasoning behind added inferences and external data. Specifically, the prompts can instruct the models to include confidence values, source citations, and explanatory information on why particular inferences or data points were selected.

For example, a prompt may specify:

"Make two inferences about risks this business deal poses. For each inference, explain your rationale in 25 words or less and rate your confidence from 1-10."

The model would then generate a response like:

"This deal risks the company overextending itself financially if sales targets are not met (confidence: 7/10). Rationale: The expanded production facilities require high fixed costs, so even small revenue shortfalls could be highly detrimental. This deal risks damaging relationships with long-term clients by competing directly against them (confidence: 6/10). Rationale: The company's move into this product line will threaten major clients who already sell similar products."

Similarly, for external data the prompts can require citing sources and explaining relevance, such as:

"Bring in two relevant data points from external sources about this company's financial standing. For each data item, identify the source, explain the relevance in 25 words or less, and rate your confidence 1-10."

The model may respond:

"Company's debt increased 30% year-over-year according to their latest quarterly filing (source: SEC 10-Q) (confidence: 9/10). This highlights the burden of their recent facility expansions. Company's bond rating was downgraded last month by S&P (source: S&P press release) (confidence: 9/10). This signals concerns about the company's financial stability amid rapid growth."

By eliciting explanatory information, the system provides transparency into the models' reasoning and selection process for inferences and external data integration.

Additionally, although often described herein with respect to one LLM, the system can leverage multiple LLMs and other trained models to allow combining their outputs for more robust summaries. The different models have complementary strengths and weaknesses that can be aggregated for improved results.

Various techniques can be used to orchestrate multi-model summarization, including one or more of the following:

- Generating multiple candidate summaries by providing the same prompt to different models; Then, an ensemble model compares the candidates and selects the best summary using consensus validation;
- Breaking down the prompt into modular sub-tasks best suited to different models, such as using a legal-focused model for contract analysis and a financial model for financial data;
- Iteratively querying different models to refine and enhance the summary, correcting errors and filling in gaps;
- Using a dominant prompt engineering model that specializes in constructing prompts tailored to each subordinate summarization model's capabilities;
- Leveraging different models for different zoom levels based on their specializations, such as financial models for negative zoom market data context;
- Programmatically generating and testing prompt variations to determine the optimal prompt phrasing and model selection for each summarization task;
- Employing a consistency-checking model to scan for contradictory information from different models and perform error reconciliation; and/or
- Comparing confidence ratings across models and preferentially weighting higher confidence responses.

By combining multiple diverse models, the system can take advantage of complementary strengths in language understanding, reasoning, data integration, and domain-specific knowledge. The orchestration mechanisms help select, refine, and consolidate model outputs to produce superior summaries compared to relying on a single model alone.

Advanced prompt engineering techniques coupled with multi-model orchestration provide transparency into the summarization process while improving output quality, context, and user trust.

The system allows flexible configuration of the amount of flexibility or looseness in the generated summary lengths for both positive and negative zoom levels.

For positive zoom levels, which condense the summary through increasing levels of abstraction, the degree of length reduction can be customized based on user needs. The system provides settings to control the rate of length decrease as the abstraction percentage increases.

For example, by default each increase of 10% in the abstraction level may reduce the word count by 15%. But users can adjust this compression rate, like reducing the word count by only 10% per 10% abstraction increase for more gradual summarization.

Regardless of the exact compression rate, the system ensures the most critical information is always included even in highly condensed summaries. This is achieved through automatic identification of salient sentences and key points using extractive summarization techniques as described previously.

For negative zoom levels, which expand the summary by eliciting inferences, integrating external data, and providing transparency into the system's reasoning, the degree of looseness in length augmentation can also be configured.

By default, the system may allow the summary length for a given negative zoom level to be up to twice as long as the corresponding positive zoom level summary.

For example, at 90% abstraction, the summary may be 100 words. At −10% abstraction, the default configuration would allow up to a 200 word summary, enabling significant expansion with inferences and external data.

However, users can customize the looseness level to allow even longer summaries at negative zoom levels if desired. The system provides settings to control the maximum expansion factor, like allowing up to 5× the positive summary length for a given negative zoom percentage.

So in the previous example, the −10% summary could be up to 500 words, permitting great flexibility in incorporating additional information.

Regardless of the configured looseness, the system ensures concise and coherent summaries by controlling the verbosity and repetition of added inferences, data points, and transparency details. The prompts are engineered to elicit focused supplemental information relevant to the user's needs.

The system's modular design allows the degree of configurability for both positive and negative zoom levels to be adjusted without impacting other functions. The customizable compression and expansion factors give users precision control over summary lengths at all levels of abstraction.

Coupled with the capabilities for multi-model orchestration, advanced prompt engineering, and dynamic data integration described previously, this configurability enables generating summaries with the right level of detail, context, and transparency for each user's specific use case.

For example, an analyst may want highly condensed overviews at positive zooms but expansive detail at negative zooms to understand the inferences and sources. A lawyer may desire more balanced lengths between zoom levels to maintain proportionality. An executive may prefer minimal length variation across the zoom range to keep messaging consistent.

By offering flexible settings for both compression and expansion factors, the system can adapt to these diverse needs and optimize information presentation for different roles and tasks. The customizability empowers users with full control over balancing brevity, completeness, and transparency in the generated summaries Example Workflow A multi-stage workflow, such as the following example workflow, may be used to support the functionality of the system through one or more of robust ingestion, content analysis, abstraction targeting, tailored summarization, and refinement. Flexible architectures allow interchangeable components while keeping the focus on customizable abstraction capabilities.

Request Ingestion

The summarization workflow may begin when a client request is received by the system's API gateway. Robust ingestion prepares the request for processing.

Load Balancing

Incoming requests may be distributed across API servers to handle high traffic volumes. Approaches may include one or more of the following:

DNS routing to distribute requests based on geography, usage patterns and current loads;

Reverse proxy servers like Nginx that forward requests to available upstream APIs;

Container orchestrators like Kubernetes that load balance across dynamic pods;

Auto-scaling groups that launch additional instances under heavy loads; and/or

Caching layers like Varnish that serve repeated requests directly.

Load balancing provides scalability and availability during traffic spikes.

Authentication

Requests may be authenticated to verify the caller's identity and authorization, and such authentication may include:

API keys, OAuth tokens, and other credentials are supported;

Middleware extracts and validates credentials from headers or parameters;

Credentials are checked against access control lists and usage quotas; and/or

Role-based access limits functionality by user permissions.

Proper authentication ensures users can only access authorized functionality.

Validation

Before processing, requests may be validated against expectations using, for example, one or more of the following:

JSON schemas, XML DTDs and other declarative constraints check payloads;

Size limits, text lengths and other constraints are enforced;

Parameter values are sanitized to prevent injection attacks; and/or

Usage quotas and rate limits prevent abuse and enforce fair use.

Validation protects downstream services from unexpected inputs.

Queueing

Validated requests are queued asynchronously for robustness, including using, for example, one or more of the following:

Message queues like Kafka, RabbitMQ or SQS buffer requests;

Backpressure prevents overloading downstream services;

Batching optimizes throughput and overhead; and/or

Prioritization ensures VIP requests are processed quickly.

Reliable queueing smooths out traffic spikes for efficient processing.

Instrumentation

Detailed metrics may be collected on requests, including, for example, one or more of the following:

API calls are metered for billing, analytics and monitoring;

Current usage is checked against quotas and limits;

Audit logs record all requests with parameters and response codes; and/or

Tracing links requests across microservices using request IDs.

Instrumentation enables usage-based billing, planning and troubleshooting.

The goal of ingestion may be maximizing security, reliability and/or monitoring of requests before summarization.

Content Analysis

Before summarization, the content may be analyzed to determine optimal approaches, including, for example:

Metadata Extraction

Metadata may be extracted to identify content types and characteristics:

Headers, filenames, MIME types, and so on may indicate formats like text, images, video, and so on;

Media attributes like resolution, duration, size may provide insight;

Hashing may detect duplicate content;

Structure analysis may identify logical sections and layout;

Optical character recognition (OCR) may extract text;

Metadata may provide a profile of the content for downstream decisions.

Natural Language Processing

For text, natural language processing extracts semantic features, including, for example:

Parts of speech, entities, sentiment, terminology;

Knowledge graphs link concepts by relationships;

Topic modeling discovers high-level themes;

Question-answering identifies information goals; and/or

Text analytics provides the semantic understanding required for abstraction.

User Preferences

Submitted user preferences guide customization, including, for example:

Summary length, style and other formatting options;

Vocabulary tuning to expertise levels;

Purpose indications like overview versus details; and/or

Accessibility needs around text alternatives.

User preferences may directly inform desired summarization behavior.

Thorough content analysis provides the necessary context to tune summarization approaches.

Abstraction Targeting

Optimal levels of abstraction may be determined dynamically for each summary request based on, for example:

Content Factors

Attributes of the content itself may guide abstraction targeting:

Highly technical or complex content may require more abstraction to simplify;

Long content can be condensed aggressively through abstraction;

Unfocused content benefits from abstraction to bring out key ideas;

Clear and concise content may need little abstraction.

Media types like audio and video may favor different abstraction approaches from text.

Content complexity and characteristics significantly influence abstraction needs.

User Parameters

User preferences and/or request parameters may further tune abstraction, including, for example:

Shorter desired summary lengths require heavier abstraction;

Specifying an overview purpose favors more abstraction;

Allowing modifications suggests deeper abstraction is acceptable;

Resource constraints like mobile devices limit viable abstraction techniques; and/or Directly requesting depth or breadth of abstraction.

User parameters may provide clear guidance on desired abstraction levels.

Use Cases

Example use cases that highlight the utility of the disclosed techniques may include, for example:
- Summarizing lengthy legal contracts into concise overviews for lawyers;
- Generating abstracts of academic papers for students and researchers;
- Distilling medical records into condensed summaries for physician review;
- Providing news article summaries for general readers; and/or
- Other example use cases, such as those described herein.

Common use cases may be used to identify established best practices for abstraction in particular context, including, for example:
- Literature reviews for research require highlighting key contributions of papers;
- Legal contract summaries focus on core obligations and exclusions;
- Social media trends favor broad overviews rather than details; and/or
- Medical record summaries emphasize diagnostic details over patient background Use cases may have known abstraction profiles.

Policy Engine

A policy engine may codify advisors' expertise into automatic decisions, including, for example:
- Rules map content factors, user parameters, and use cases to ideal abstraction levels;
- Policies embed best practices from advisors and governance boards;
- Defaults handle ambiguous cases reasonably; and/or
- Contextual decisions maximize overall utility for each request.

Policy engines scale expertise for large-scale personalization.

Precision dynamic abstraction targeting may be used to enable optimally customized summarization.

Summarization

Specialized summarization services generate abstractive summaries tuned to target levels, including, for example:

Extraction

Extractive methods identify salient passages in the original content to summarize:
- Statistics like term frequency-inverse document frequency (TF-IDF) score sentences;
- Graph algorithms model sentence relationships and centrality;
- Supervised classifiers predict sentence relevance based on annotations; and/or
- Constraints enforce diversity, coverage and length limits.

Extraction distills source content into concise overviews.

Abstraction

Abstractive methods generate new text capturing core semantics:
- Encoder-decoder neural networks fuse content into vector representations;
- Attention mechanisms focus decoding on key information;
- Beam search produces multiple candidate summaries for selection; and/or
- Paraphrasing condenses and refines text.

Abstraction produces fluent natural language summaries.

Query-Based

Query-based methods tailor summaries to user information needs:
- Questions analyze information goals;
- Knowledge bases provide relevant facts; and/or
- Summaries generated around facts using extraction and abstraction.

Query-based summarization delivers focused, relevant information.

Hybrid

Hybrid approaches blend extraction, abstraction and querying:
- Multi-document narratives merge common information;
- Encoders incorporate facts from knowledge bases; and/or
- User feedback tailors summaries iteratively.

Hybrids maximize sophistication through synthesis.

Specialization improves relevance for specific use cases while modularization enables diverse configurations.

Abstraction Control

Completed summaries are tuned to target abstraction levels:

Compression

Lengthy summaries are compressed to focus on key ideas:
- Scoring separates core ideas from peripheral details;
- Similar sentences are consolidated through paraphrasing; and/or
- Redundancy removal streamlines content.

Compression tailors verbose summaries to desired lengths.

Expansion

Sparse summaries are expanded to add informative context:
- Facts are retrieved from knowledge bases to enrich content;
- Descriptive details are incorporated from source materials; and/or
- Analogies and examples illustrate concepts.

Expansion incorporates color and improves clarity.

Refinement

An iterative refinement process aligns abstraction to targets:
- Automated techniques adjust vocabulary, length and structure;
- Manual review by editors provides human guidance;
- User feedback trains models and suggests edits; and/or
- Multiple refinement cycles converge on goals.

Refinement precision-tunes abstraction to needs.

Evaluation

Automated metrics quantify abstraction levels:
- Text complexity analysis determines vocabulary and readability;
- Semantic equivalence metrics compare meaning preservation; and/or
- Subject matter expert reviews assess appropriate breadth and depth.

Evaluation validates abstraction accuracy and quality.

Precision abstraction control tailored to each request is the essence of innovation.

Delivery

The final customized summary is returned to the user:
- Usage metrics inform monitoring, billing and optimization;
- Output may be cached globally or per user for performance;
- Users provide feedback through ratings and comments to drive improvements; and/or
- Summaries are formatted for seamless integration into client workflows.

Smooth delivery completes the summarization workflow.

Figure 4A:
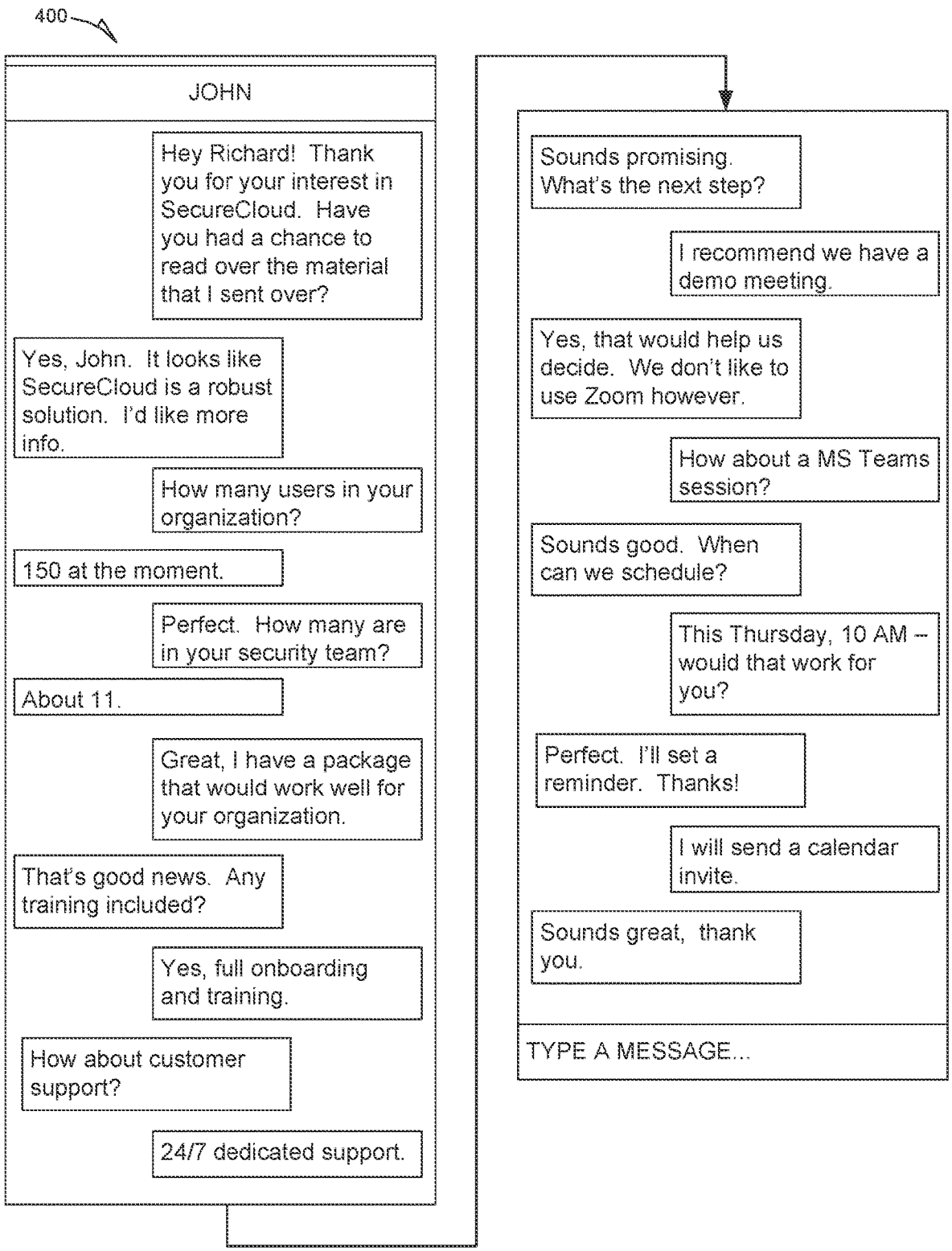
FIGS. 4A-4D are a series of block diagrams depicting example content comprising a chat that is represented at multiple zoom levels in a user interface responsive to user input.
Figure 4B:
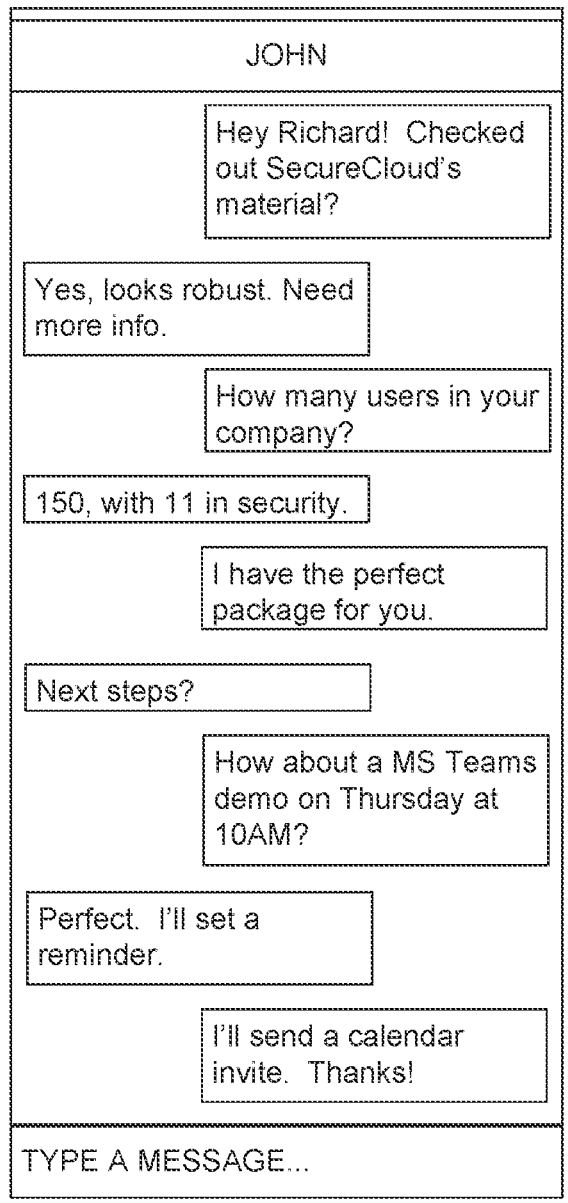
Figure 4C:
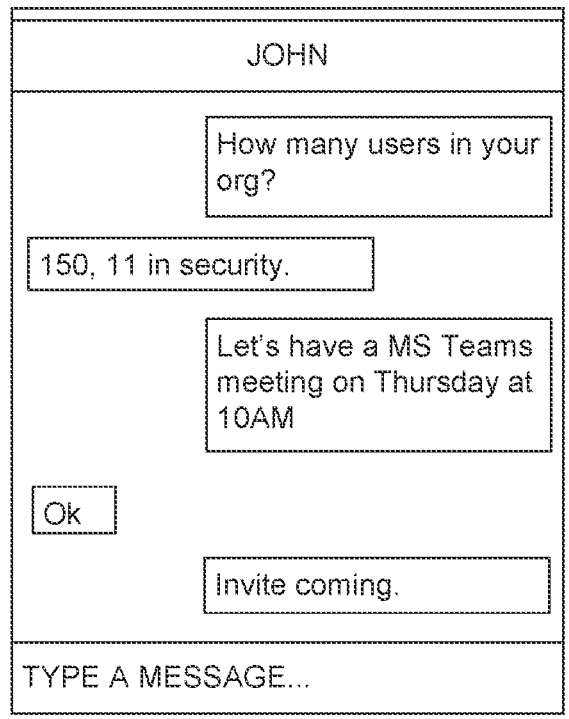
Figure 4D:
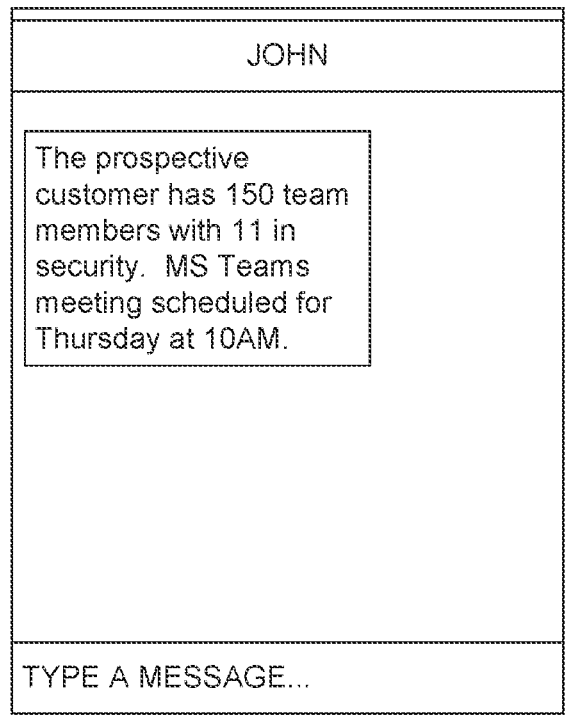

FIGS. 4A-4D are a series of block diagrams depicting example content comprising a chat that is represented at multiple zoom levels in a user interface responsive to user input. For example, FIG. 4A is an example representation of the chat at a first zoom level (e.g., 100%); FIG. 4B is an example representation of the chat at a second zoom level (e.g., 50%); FIG. 4C is an example representation of the chat at a third zoom level (e.g., 25%); FIG. 4D is an example representation of the chat at a fourth zoom level (e.g., −10%).

Example User Interfaces

The system features an intuitive user interface enabling anyone to effortlessly summarize content at any level of detail in real-time. The slick slider-based controls abstract away the complexity of state-of-the-art AI technologies to make dynamic summarization accessible.

The main interface displays the Zoom Slider ranging from −100 to +100. This full spectrum slider enables seamlessly condensing overviews or expanding details. Additional controls give users precision real-time customization.

The Zoom Lock locks the level in place as the user scrolls so the summary perspective persists. The Zoom Speed Slider controls the rate of abstraction change. Faster zooming compresses content rapidly while slower zooming provides smoother graduations.

The Zoom Window sets the abstraction visible around the locked level, like showing ±10% to keep context stable. The Extractive/Abstractive Slider biases the techniques, with extractive favoring key sentences and abstractive favoring paraphrasing.

For negative zooming, the Inference Dial controls inference depth, the External Data Knob balances internal vs external content, and the Transparency Slider reveals reasoning. Users can also directly ask questions to elicit Q&A expansions.

Clicking any section of a summary probes its origin. For example, clicking an inference shows the reasoning chain and data supporting it. Clicking external data reveals the sources integrated. Users verify the augmented information is relevant and properly attributed.

For transparency, the system provides metadata like confidence scores for inferences, relevant citations for facts, timestamps for time-sensitive data, and algorithms used to generate the summary. Users can provide feedback on these aspects.

The system architecture combines diverse AI technologies to enable real-time performance and personalization:

Extractive and abstractive summarizers identify and distill key ideas using encoder-decoder networks trained on domain-specific corpora. Classifiers categorize content facets using convolutional neural networks. Question answerers retrieve salient details with transformer architectures.

Large language models generate fluent summaries in target styles with proper grammar and coherence. Inference engines extrapolate insights through neural symbolic reasoning and knowledge graph traversals. Data retrievers integrate external sources using dense retrievers and inverted indexes.

Sentiment analyzers, readability predictors, and user feedback engines further enhance personalization. The orchestrator coordinates model workflows based on zoom settings and usage context. A distributed microservices design scales on-demand.

Real-time caching indexes pre-computed intermediate summaries, inferences, and data for low-latency assembly into complete summaries. Optimized data stores persist petabytes of training corpora, documents, and public/private data sources.

This architecture supports summarizing diverse content types for any user need:

Legal documents like contracts and litigation briefs are summarized for lawyers reviewing details or wanting executive briefings. Technical specifications are abstracted for engineers per their expertise levels.

Doctors summarize medical studies and patient health records based on specialties. Financial analysts distill earnings reports, finance literature, and market data at desired zoom depths. Policy advisors summarize regulations and proposals for stakeholders.

Students summarize textbooks, papers, lectures, and online materials at appropriate reading levels. Journalists abstract interviews, scientific studies, and background sources into news articles for general audiences.

Subject matter experts summarize research papers and field-specific documents to share with colleagues. Government analysts summarize reports across sources to identify patterns and derive insights.

The system adapts the vocabulary, prose style, and background knowledge in generated summaries to each user's level of expertise, technical familiarity, and educational proficiency.

For enterprises, the interface can be embedded in productivity tools, knowledge management systems, and collaboration workflows to enhance document understanding and sharing. Summaries help workers digest dense material efficiently.

The seamless zooming and transparency empower users to dynamically control how much information is shared. Sensitive details can be zoomed out while inferences are zoomed in for analysis. The system improves productivity across diverse use cases.

The highly intuitive interface makes the system accessible to anyone needing to summarize or understand complex documents in real-time. Smooth zooming, precision controls, personalization, and transparency enable users to dynamically adapt the summary perspectives, depth, and details to their exact needs.

The system may include one or more user interfaces that enable easily configuring and accessing the multi-resolution zoomed abstractions on both the positive and negative scales.

Specifying Zoom Levels

Users can specify custom zoom levels on the positive and negative scales using slider controls, text entry fields, or preset buttons:

Zoom Level Sliders

This allows the user to dictate the precise levels of abstraction they desire for a given summarization task. Common presets include 10%, 25%, 50% and 75% in both directions.

Accessing Positive Summaries

The positive zoom interface displays the generated summaries for the specified conciseness levels:

Positive Summary View

At a glance, the user can view the core distilled content of the original source material at varying levels of abstraction, from high-level overviews down to more granular detail.

Summary excerpts are shown directly in the interface to allow quick scanning. Full summaries can be expanded or downloaded for further analysis.

Augmented Negative Summaries

The negative zoom interface may mirror the positive summary content but enhance it with additional augmentations:

Negative Summary View

The same core summary content is present but now supplemented with inferred insights, contextual data from external sources, and metadata qualifications.

Inferred conclusions are labeled with confidence scores.

Related data links are characterized by relevance. The specificity of reasoning for inclusions is displayed.

This allows the user to quickly view the core summary content while also leveraging the value-added augmentations if desired.

Comparing Positive and Negative Pairs

A split screen view is available to compare positive and negative summaries side-by-side:

Split Screen Comparison

This enables the user to directly contrast the core positive summary with the augmented negative version. The augmentations are clearly called out, while still allowing easy reference back to the original core summary content.

Interactive Metadata

The metadata qualifications for the negative summary augmentations are interactive:

Interactive Metadata

Mousing over a confidence score will reveal the underlying reasoning and logic behind the inference. Clicking a relevance rating will display the pertinent extract from the linked external source. The specificity can be expanded to show the full trail of evidence that led to an inclusion.

This allows the user to transparently assess the reliability and value of the augmentations as needed.

Customizable Augmentation Display

Options are provided to filter and focus the augmentations:

Augmentation Display Settings

The user can choose to view only augmentations above a certain confidence threshold, or only ones linked to a particular domain of external sources. The specificity and relevance metadata can be toggled on or off.

This allows customized control over the negative summary display to focus on the most relevant augmentations.

Retaining Underlying Source Data

The original source documents are always accessible:

Accessing Source Data

Links are provided enabling drilling down to the specific sections of the source data that contributed to a given summary excerpt. This allows tracing back to the underlying evidence.

The source materials are also available independent of the summaries for direct access when needed.

The zoom levels in the user interface can be configured to correspond to 100% minus the abstraction percentage.

For example:

+100% zoom=0% abstraction
+50% zoom=50% abstraction
0% zoom=100% abstraction

And on the negative side:

−100% zoom=0% abstraction
−50% zoom=50% abstraction
0% zoom=100% abstraction

So in this configuration, the zoom percentage gets lower as the abstraction percentage gets higher in both directions.

User Interface Controls

The zoom level slider control would reflect this relationship:

Zoom Slider

The rightmost+100% position represents no abstraction −the full content is shown.

As the slider moves left, the zoom level drops while abstraction increases.

At the 0% midpoint, the content is fully abstracted to its essence.

In the negative region the enhanced summaries are progressively more abstracted.

The slider enables smoothly adjusting the zoom/abstraction level. Text entry and presets can also be used.

Positive and Negative Mirrored Summaries

With this configuration, the levels of summarization on the positive and negative sides mirror each other:

+80% zoom shows the same level of summarization as −80% zoom

+60% matches −60%, +40% matches −40%, etc.

The difference is the negative side adds augmentations and metadata on top of the core summary content.

So +50% and −50% may contain the same key distilled points from the original data. But −50% enhances this with inferences, external data, and qualifications.

User Interface Examples

The user interfaces would reflect this mirrored relationship:

Positive Summary
Negative Summary

Despite being inverses, the +80% and −80% summaries contain the same core content. The negative version has simply enhanced it with augmentations.

Benefits of Zoom vs. Abstraction

Representing zoom as the inverse of abstraction has some advantages:

It may be more intuitive for users to think in terms of "zooming out" as abstraction increases.

The metaphor of zooming in for more detail and out for more overview is familiar.

Having 100% as the starting point where no abstraction is applied is logical.

The bidirectional zoom slider visually represents the continuum of abstraction levels.

So while mathematically zoom is the inverse of abstraction, conceptually this relationship aligns well with the system's capabilities. The interfaces can leverage the zoom metaphor effectively.

Implementation Details

Here are some key details on implementing this relationship in the summarization system:

Configuration Settings

The system allows configuring whether zoom is treated as the inverse of abstraction or as independent levels. This provides flexibility.

Calculation Logic

The abstraction algorithms utilize the configured zoom/abstraction levels during processing. Converting between the two is trivial.

Interface Linkages

The interfaces link the zoom slider positions/text entries to drive the abstraction engine appropriately. The displayed summaries update dynamically.

Server-Side Processing

While interfaces may display zoom controls, abstraction can be handled server-side. This avoids client devices needing the full processing logic.

Zoom-Abstraction Equivalence

The system stores matched zoom and abstraction levels to enable linking interfaces with summarization results.

User Preferences

Users can override default settings if they prefer treating zoom and abstraction as independent rather than inverses. This gets persisted in their user profile.

Use Cases

Here are some examples of how this zoom-abstraction relationship can be leveraged by users:

Research Analysis

A researcher needs to summarize a collection of medical journals to extract key insights. Using the zoom slider, they interactively dial in the level of abstraction needed:

At +100% zoom no abstraction is applied, showing full journal content.

They slide left to +50% zoom to get moderately concise overviews of each journal's core findings.

Sliding further left to +20% zoom provides higher-level summaries focused on key statistics and conclusions.

At 0% the summaries become very condensed 5-sentence extracts.

In the negative region, the −20% summaries add speculative extrapolation and outside data to the core content.

Contract Review

A lawyer needs to analyze a long contract. They leverage the zoom abstraction relationship:

+100% zoom shows the full contract text.

+80% provides a good overview of the contract structure and terms.

+50% distills sections down to key clauses and obligations.

0% gives a very high-level summary of the purpose and parties.

At −50% zoom the same key clauses are enhanced with inferred risks and precedents.

−80% zoom further augments the overview with insights on negotiation implications.

Literature Synthesis

A student needs to synthesize key points across many research papers related to their dissertation. They use the zoom interface:

+100% zoom shows full papers.

+75% zoom provides condensed overviews of each paper's findings.

+50% zoom further focuses the overviews on core contributions.

0% zoom gives very short 1-2 sentence summaries.

−50% zoom enhances with speculative links between papers.

At −75% zoom broader themes and trends are extracted and augmented across the literature.

Users can fluidly adjust zoom levels to control abstraction in both directions, leveraging augmentations on the negative side. The system handles converting zoom to abstraction levels during processing.

Example Use Cases

Here are some examples of how users can leverage these interfaces when interacting with the system:

Contract Analysis

A lawyer needs to quickly analyze a 100-page contract before an upcoming negotiation. They use the system to generate positive and negative zoomed summaries:

They specify zoom levels of 25%, 10%, and 5% in both directions to get overviews as well as granular detail.

Scanning the 25% positive summary provides a high-level understanding of the contract structure and terms.

They focus in on a 10% negative summary of a particular section to view key clauses augmented with inferred risks, precedent cases, and domain expertise on negotiation implications.

Comparing the 5% positive and negative summaries side-by-side enables closely analyzing fine print details while still benefiting from the augmentations.

Interactive metadata allows assessing the confidence and relevance of the augmentations to determine validity.

All summaries are linked back to the underlying contract text for verification as needed.

Literature Review

A graduate student needs to survey the literature on topics related to their thesis. They leverage the system to quickly process a large volume of academic papers:

Broad 75% positive summaries provide high-level overviews of the paper contents, findings, and conclusions.

More granular 25% negative summaries also incorporate speculative extrapolation of the implications of the findings for the student's own thesis topic.

The student filters the augmentations to only show inferred connections above a 60% confidence threshold.

They scan the negative summaries to get the core paper overviews along with likely relevant linkages to their own work.

Underlying papers are easily accessible from all summaries to verify details as needed.

Codebase Onboarding

An incoming software engineer needs to quickly come up to speed on a large, complex codebase. They use the system to orient themselves at multiple levels:

50% positive summaries provide architectural overviews of the main components and functions.

10% negative summaries explain individual modules and classes augmented with inferred dependencies and integration points called out.

Side-by-side comparison shows both overview and granular summaries enhanced with insights.

Hovering the specificity metadata reveals the evidence chain for how certain inferences were made from the code.

The source code is linked from all summaries for hands-on orientation.

In these examples, users can leverage the mirrored positive and negative summaries at varying levels of abstraction to efficiently analyze large source materials augmented with AI-generated insights. The interactive interfaces empower users to consume, verify, and benefit from the core distilled content and value-added augmentations.

Example APIS and SDKS

To enable seamless integration into third-party applications and workflows, the system exposes its real-time dynamic summarization capabilities via robust APIs and SDKs.

These programmatic interfaces allow intelligent agents, customer service systems, research tools, and other applications to leverage the system's advanced AI summarization and transparency features on demand.

The core API is the Summarize API which accepts a content item and desired zoom level as input parameters. The API request would specify the content to summarize either via text input or URL:

```
POST/summarize
{
"content": "Text to summarize . . . ",
"abstraction": 50
}
```
The API response contains the generated summary adapted to the requested zoom level:
```
{
"summary": "Concise overview of the provided content . . .",
"zoom": 50
}
```
Additional parameters can specify the user or use case context to personalize the summary, control length and style, set caching options, and other configuration details.

For retrieving pre-computed cached summaries, the Get Summary API allows specifying a content ID and zoom level to directly retrieve the indexed summary:

GET/summaries/{contentId}?zoom=50

This enables ultra-low latency summarization using cached intermediary results compared to dynamically generating a new summary.

To programmatically zoom in and out of a summary, the Zoom Summary API allows incrementally adjusting the abstraction level without re-submitting the full content:
```
PUT/summaries/{contentId}
{
"zoomDelta": -10
}
```
The updated summary at the new zoom level is returned. This supports exploratory workflows drilling into details.

For transparency, the Explain API provides attribution data on any section of a generated summary:
```
POST/explain
{
"summary": " . . . ",
"section": " . . . "
}
```
It returns metadata like inference probabilities, source citations, algorithm used, and other transparency information about that summary excerpt.

The Query API allows programmatically asking questions to expand summary coverage of key topics:
```
POST/query
{
"summary": " . . . ",
"question": " . . . "
}
```
It returns a concise answer excerpt that can be inserted into the summary.

To programmatically integrate external data, the Augment API allows passing in content to summarize along with data sources, search queries, or other information needs. The augmented summary integrating the external data is returned.

For training and optimization, the system provides APIs to retrieve usage analytics, submit user feedback, manage document collections, upload ontologies, and configure pipelines. The microservice architecture enables each API component to scale independently.

SDKs make it easy to integrate these APIs into diverse applications:

Summarization SDK—Core wrapper for generating, zooming, and explaining summaries.
Search SDK—Summarizes search results and documents returned from queries.
Customer Service SDK—Summarizes customer cases and CRM data to resolve issues faster.
Agent SDK—Enables bots and assistants to summarize conversations and documents.
Analytics SDK—Summarizes reports, dashboards, and data visualizations.
Research SDK—Distills academic papers, articles, and citations for researchers.

The APIs and SDKs enable any application to augment existing workflows with dynamic summarization capabilities. Examples include:

An intelligent agent for customer service can summarize long complaint tickets submitted by users to quickly understand the core issue and history before responding.

A legal discovery application can distill key facts and evidence from large document collections and drill into details on demand.

A market intelligence tool can summarize the latest news, social media, and reports to detect trends and sentiment shifts.

A code documentation system can generate concise, explanatory summaries of source code modules at desired levels for programmers.

A research paper recommendation engine can summarize collections of papers on topics of interest to a scientist to surface relevant new findings.

By providing programmatic access to its summarization functionalities, the system enables integrating dynamic, personalized summarization into endless use cases across industries and verticals. The powerful APIs and SDKs make the technology accessible to improve workflows in any domain.

Example Administrative Controls and User Interfaces

User Management

The system enables creating and managing user accounts with role-based access controls. Single sign-on integration with enterprise directories is supported.

The user management module allows administrators to:

Create user profiles for employees, customers or external users. User attributes like name, email, department, location etc. can be specified.

Assign roles like Viewer, Editor, Reviewer, Admin etc. Each role maps to predefined permissions like summarizing content, editing summaries, configuring system.

Import users and groups from corporate directories like ActiveDirectory via LDAP sync. This enables single sign-on based on enterprise credentials.

Manage passwords, reset forgotten passwords, and set password policies and strength requirements.

Enable multi-factor authentication via options like biometrics, security keys, one-time codes etc.

Create user groups for collaboration like teams, departments, internal vs external users. Share summarization settings and permissions across groups.

View activity logs to audit user actions like documents summarized, queries made, settings changed etc. Filter logs by date range, user, content type etc.

For example, a media company can provision separate user groups for writers, editors, fact checkers, reviewers and admins. Writers can summarize content while editors can edit summaries by locking zoom levels. Reviewers provide feedback on summary quality.

Model Management

Administrators can configure the AI models used for summarization based on accuracy, performance and cost needs. The system employs a modular ensemble of models.

The model management module enables administrators to:

Select extractive and abstractive models from a model catalog containing options like BERT, GPT-3, T5, BART and other encoder-decoder networks fine-tuned for summarization.

Pick question answering and dialogue models like CoQA, QuAC, DialoGPT for querying summaries. Choose models optimized for conversational or factual responses.

Add custom large language models like GPT-3, Codex, PaLM etc. Fine-tune on domain-specific text to adapt vocabulary and writing style.

Set hyperparameters for models like length, temperature, top-k sampling etc. Higher temperature produces more creative but less focused summaries.

Create ensembles blending extractive, abstractive and question answering models. Ensembling improves accuracy but may increase latency.

Manage model versions and evaluate new models on an offline staging environment before approving them for production.

Switch models automatically based on criteria like user role, content type, language etc. For example, use simpler models for low-expertise users.

For instance, a healthcare company can use abstractive models trained on medical text to generate summaries using proper terminology. Question answering models can provide helpful explanations of clinical concepts.

Summarization Configuration

Admins can define summarization policies to conform to enterprise standards around length, style, formats and reading level based on user needs.

The summarization configuration module enables administrators to:

Set length limits for different zoom levels like 250 words for 85% zoom, 500 words for 70% zoom etc. Enforce minimum length for overly-concise models.

Configure target lengths for different user roles and content types. Executives may get 100-word previews while analysts get 500-word overviews.

Customize vocabulary, prose style and reading level of summaries based on user education and technical abilities.

Block offensive, inappropriate or unprofessional language using mature content filters and human review workflows.

Choose output formats like simple text, rich text, HTML, PDF, audio etc. Support assistive formats for accessibility.

Redact or mask sensitive data fitting defined patterns like credit card numbers, phone numbers, addresses etc.

Prevent exposure of confidential, proprietary or trade secret information.

Label generated summaries based on trustworthiness, tone and other attributes using classifier models.

For example, an enterprise social network can configure summarization of posts and conversations to use simple vocabulary suitable for a mainstream audience.

Performance Optimization

Admins can optimize system performance for low-latency summarization and efficient resource utilization based on usage patterns.

The performance optimization module provides:

Caching of pre-computed extractive summaries, Q&A responses and external data for common content types and zoom levels.

Indexing content, intermediate outputs, and data sources for ultra-fast lookup and retrieval. Optimize index rebuilding frequency.

Scaling model inference horizontally across GPU clusters to parallelize requests and reduce latency. Add auto-scaling groups.

Balancing cost vs performance by selecting optimal combination of caching, indexing, parallelization etc.

Monitoring system metrics like requests queued, latency, models invoked etc. Set performance alerts.

Tracing detailed request logs to identify bottlenecks. Tune problematic models or workflows.

Comparing performance benchmarks vs baselines to quantify improvements from optimizations.

For instance, a news aggregation site can optimize for low-latency summarization at scale during peak traffic hours by caching, indexing, and horizontal scaling.

Integration & Extensibility

Integration APIs and event triggers (e.g., webhooks) enable extending the system's capabilities by hooking into external apps, data sources and workflows.

The integration module allows administrators to:

Provision API keys and credentials for external apps to access summarization, search and analytics APIs.

Configure role-based permissions for API access like read-only for search vs read-write for summarization.

Set usage quotas and limits for API requests, content volume, user accounts etc.

Enable event triggers to post summary notifications to communication and collaboration tools like Slack, Teams etc.

Build custom summarization extensions using SDKs. Publish extensions in an add-on marketplace.

Develop custom skills or actions for voice assistants to summarize documents using natural language.

Integrate with external analytics tools like Tableau or PowerBI to visualize summarization analytics.

Connect to data visualization widgets to display interactive summaries of dashboards, reports and graphs.

For example, a consulting firm can build a custom extension summarizing client reports and surfacing insights to help consultants provide quality recommendations faster.

Multi-Tenancy

The system supports secure isolation of configurations, data and usage across multiple separate tenants with dedicated resources.

The multi-tenancy module enables administrators to:

Provision new tenants as independent logical instances with customizable settings.

Allocate tenant-specific resources like storage, compute and memory to prevent noisy neighbor issues.

Restrict tenants from accessing data or usage details of other tenants for privacy and security.

Copy configurations, models and metadata across tenants to quickly replicate environments.

Migrate tenants and their data between environments like dev, test, staging and production.

Deploy tenant upgrades and new versions with zero downtime through blue-green deployments.

Scale tenants independently by adding resources to meet demand spikes for specific tenants.

For example, a SaaS provider can onboard customers as isolated tenants with customizable summarization settings and dedicated resources allocated based on paid tiers.

Monitoring & Analytics

Detailed monitoring provides administrators visibility into system usage, performance, outputs and issues to drive optimizations.

The analytics module enables administrators to:

Track usage metrics across users, content types, models, tenants etc. Report on most active users, popular content etc.

Monitor system performance like query latency, uptime, traffic volume, capacity etc. Set alerts for anomalies.

Aggregate accuracy ratings provided in user feedback on summaries. Identify low-rated models.

Analyze trends in usage, performance and summary quality over time. Predict future capacity needs.

Log errors, warnings, exceptions etc. Filter to surface frequent or high-severity issues.

Allow filtering and segmentation of analytics by any dimension like user, content type, model etc.

Visualize analytics through charts, graphs and dashboards for insights. Export reports.

For instance, a bank can track summarization accuracy for financial documents to identify gaps needing additional model training or configuration tuning.

Billing & Cost Optimization

For cloud deployments, administrators can configure cost tracking, alerts and autoscaling to optimize spending.

The cost management module enables administrators to:

Link cloud provider accounts for consolidated billing and cost tracking.

Set overall budgets and cost alerts to control spending. Receive notifications on projected overages.

Allocate cloud costs by department, project, tenant etc. Showback costs to business units based on usage.

Automatically scale resources like GPU clusters up or down based on load to minimize waste.

Rightsize resource allocations to balance performance and costs. Favor spot or reserved instances.

Analyze costs by cloud resource types, tenants, and other dimensions. Identify cost drivers.

Compare costs across time periods and tenants. Project future spending based on usage trends.

For example, a startup can optimize cloud costs by autoscaling summarization resources to meet fluctuating traffic demands instead of overprovisioning.

Environments

Administrators can create separate environments like development, testing, staging and production for isolation. Environments can have different users, models, data and settings.

The environments module enables administrators to:

Provision distinct dev, test, staging and production environments with controls to prevent mixing data across environments.

Customize environments individually—test may focus on latest models while production emphasizes stability.

Test summarization configuration changes in staging before approving for production.

Limit access to production environment to only essential admin users.

Refresh dev/test environments from production data periodically while blocking production access.

Deploy new versions to staging on release candidates. Upon approval, quickly swap into production.

Roll back from bad deployments by reverting staging/production to last known good version.

For example, a research institute can test summarization of scientific papers in a dev environment before deploying successfully evaluated configurations to a production environment used by researchers.

Access Controls

Granular access controls secure the system and protect sensitive data. Access policies are customizable based on enterprise needs.

The access control module enables administrators to:

Set corporate password policies—length, complexity, expiration etc. Enforce multi-factor authentication for critical access;

Configure role-based access controls for user groups based on the principle of least privilege;

Limit visibility of confidential documents and summaries to authorized user roles only;

Anonymize sensitive data like names, addresses etc. in summaries to prevent exposure;

Redact, mask or block restricted content from summaries to enforce compliance rules;

Isolate tenants through access controls to prevent data blending across tenants;

Revoke access immediately for employees leaving the organization or changing roles; and/or Audit all user activity and access logs. Scan logs to detect anomalies and generate alerts.

For example, a law firm can restrict access to summaries of confidential client documents only to the attorneys working on that case.

Granular access controls may be implemented to restrict document and summary access to only authorized user roles. Summaries of sensitive data may only be visible to approved personnel.

Data Management

Administrators control what data sources are available for the system to connect to and summarize, including public reference data and private enterprise data.

The data management module enables administrators to:

Ingest and index public datasets like Wikipedia, industry taxonomies, financial data etc.

Connect to internal databases and data warehouses via database connectors and APIs.

Upload internal knowledge bases, document collections, ontologies etc.

Configure refresh schedules to keep real-time data updated from streaming sources.

Set access controls on private data to restrict visibility based on user roles and attributes.

Mask or anonymize private data like customer names and addresses before summarization.

Prioritize data relevance, accuracy, timeliness and other factors when retrieving external data.

For instance, an insurance firm can ingest their large corpus of actuarial data and research reports to generate better summaries of insurance claims.

Model Training

Administrators can schedule and manage ongoing training of summarization models on new documents to continuously improve accuracy.

The model training module enables administrators to:

Configure training schedules—daily, weekly etc. Trigger training pipelines programmatically.

Select corpora for training like enterprise documents, industry corpuses, current news etc.

Continuously annotate new user-provided summary feedback for model retraining.

Manage and tune hyperparameters used for training like learning rate, epochs etc.

Evaluate new model versions on dev sets. Track metrics like ROUGE over time.

Retrain individual models or ensemble on new data. Specialize models for specific content types.

Roll back models to last known good version if evaluation shows regressions.

For example, a publisher can train summarization models on new books and periodicals to keep up with evolving language and vocabulary.

Providing extensive and intuitive configuration capabilities enables adapting the system to diverse enterprise summarization needs while maintaining core real-time performance powered by large language models and AI orchestration.

Example: Large Contract

Here is an example of how the system may be configured to operate with respect to an example legal document. Assume the content to which the system applied is a 50-page contract between two companies, Company A and Company B, detailing a partnership agreement for developing and marketing a new software product. Key sections cover the following:

Background on both companies;
Scope of partnership—Division of roles and responsibilities;
Financial terms—Revenue sharing, investments, payment schedules;
Intellectual property—Patents, licensing, ownership;
Warranties and liability—Security, privacy, insurance;
Dispute resolution process—Arbitration, governing law; and
Term and termination—Length of agreement, renewal/expiration clauses.

Assume the system is requested to produce a summary of the document at various zoom levels, including Positive Zoom Level 1 (99.90% abstraction), Positive Zoom Level 2 (99.94% abstraction), Positive Zoom Level 3 (99.96% abstraction), Negative Zoom Level 1 (−0.04% abstraction), and Negative Zoom Level 2 (−0.06% abstraction).

The system determines desired lengths or sizes of the responses for the LLM. For example, the system determines the lengths or sizes based on the abstraction level in comparison to the original content. For example, the system may estimate that the document contains 250,000 words in total (e.g., 5000 words per page, and determine the desired lengths or sizes of the responses based on percentages that corresponds to the abstraction levels. The system then automatically generates a series of prompts corresponding to these zoom levels, sends them to the LLM, and receives responses from the LLM.

Positive Zoom Level 1:
Example Prompt: "Please summarize this legal contract in 99.90% fewer words, preserving key terms and details."
Example Response: "The 50 page contract between Company A and Company B outlines a partnership agreement for developing and marketing a new software product. Key sections cover the division of roles and responsibilities, financial terms like revenue sharing, intellectual property ownership, warranties and liability provisions, dispute resolution through arbitration, the 5 year term, and termination clauses."

Positive Zoom Level 2:
Example Prompt: "Please summarize this legal contract in 99.94% fewer words, preserving key terms and details."
Example Response: "The contract outlines a partnership between Company A and Company B to develop and market a new software product. It covers the division of responsibilities, financial terms, IP ownership, liability and warranties, arbitration for disputes, a 5 year term, and termination provisions."

Positive Zoom Level 3.
Example Prompt: "Please summarize this legal contract in 99.96% fewer words, preserving key terms and details."
Example Response: "The contract establishes a partnership between two companies to develop and market a software product. It lays out key terms related to roles, finances, IP, liability, dispute resolution, length of agreement, and termination."

Negative Zoom Level 1:
Example Prompt: "Please summarize this legal contract in approximately the same number of words a 99.96% abstraction level summary would be. Feel free to slightly exceed the length limit if needed to preserve key details. Also, make any important inferences and incorporate the most relevant external information."
Example Response: "This is a 5 year, $5 million contract between Smith Co. and Jones Co. for supply of computer parts, based on my moderately high confidence (8/10) inference from the pricing terms. It covers pricing, delivery, quality control, dispute resolution, and other key terms. Relevant industry data shows an average defect rate of 2% for computer parts (external information −9/10 confidence), providing context for the quality control terms."

Negative Zoom Level 2:
Example prompt: "Please summarize this legal contract in approximately the same number of words a 99.98% abstraction level summary would be. Feel free to slightly exceed the length limit if needed to preserve key details. Also, make any important inferences and incorporate the most relevant external information."
Example response: "5 year, $5 million computer parts supply contract between Smith Co. and Jones Co. Key terms include pricing, delivery, quality control, dispute resolution. Average industry defect rate is 2% (external data, 8/10 confidence), providing context on quality control terms."

Figure 5A:
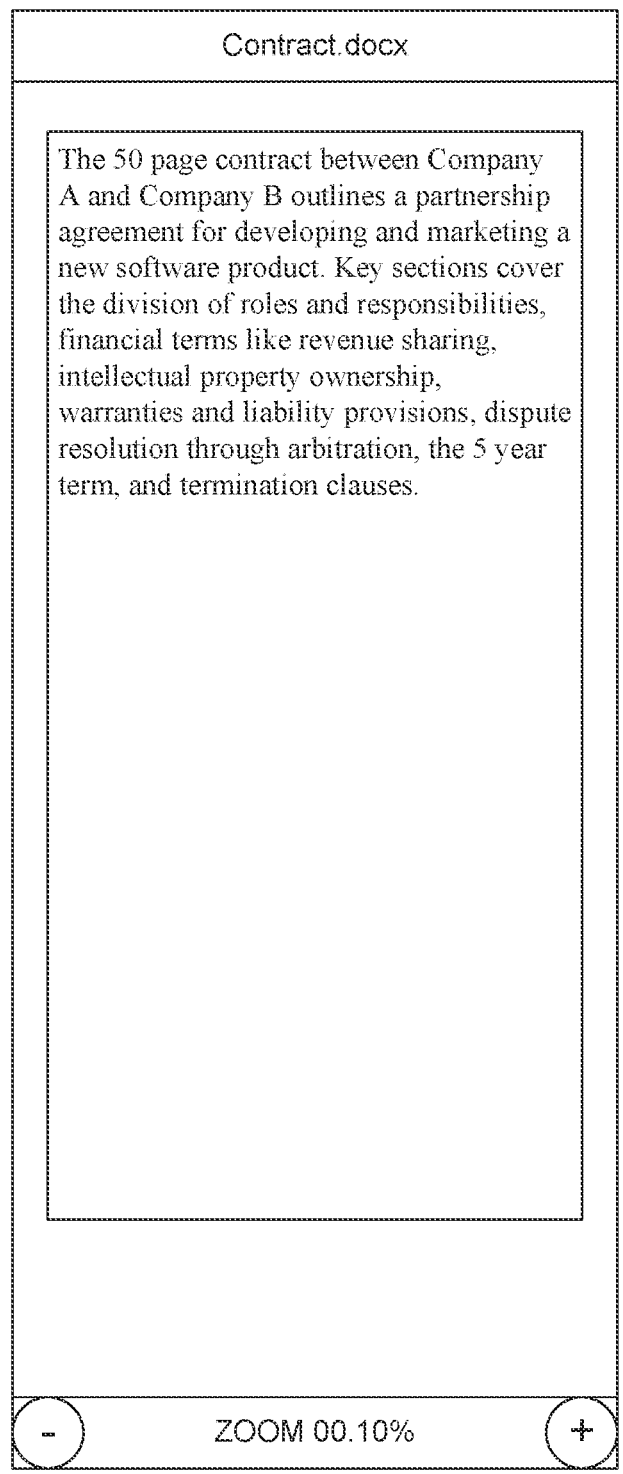
FIGS. 5A-5E are a series of block diagrams depicting example content comprising a legal document that is represented at multiple zoom levels in a user interface responsive to user input.
Figure 5B:
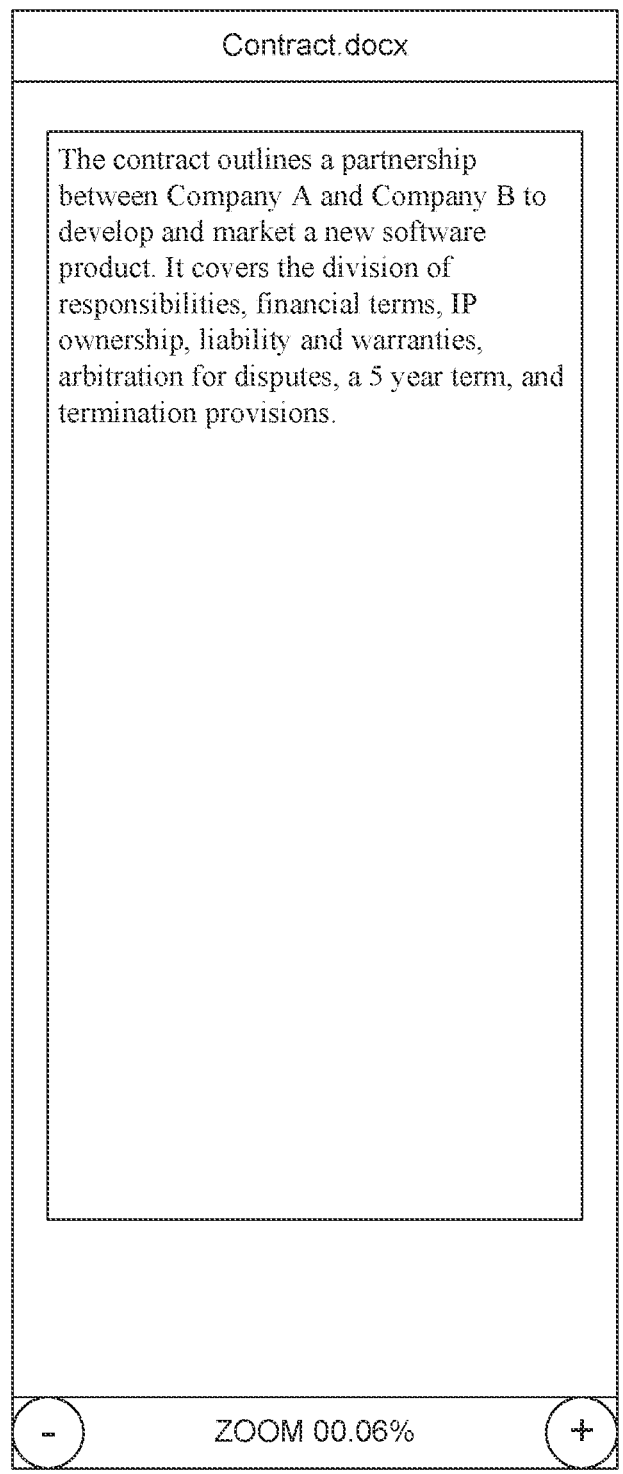
Figure 5C:
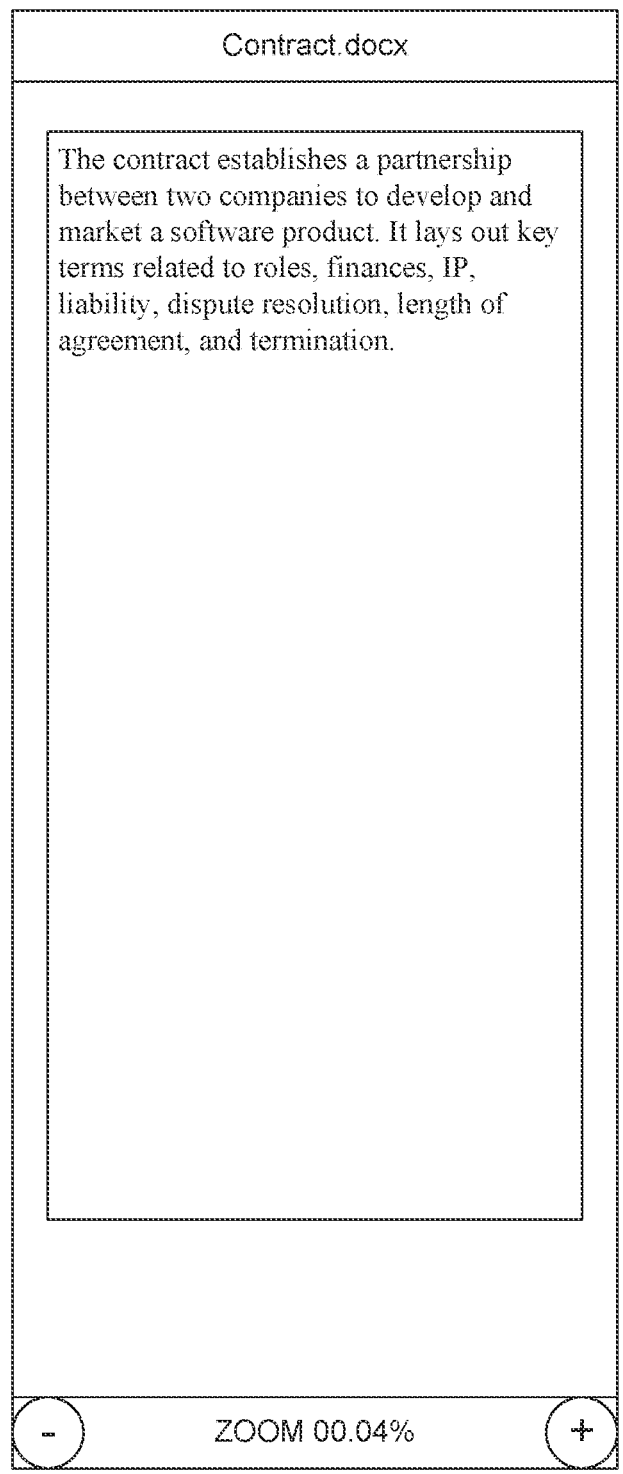
Figure 5D:
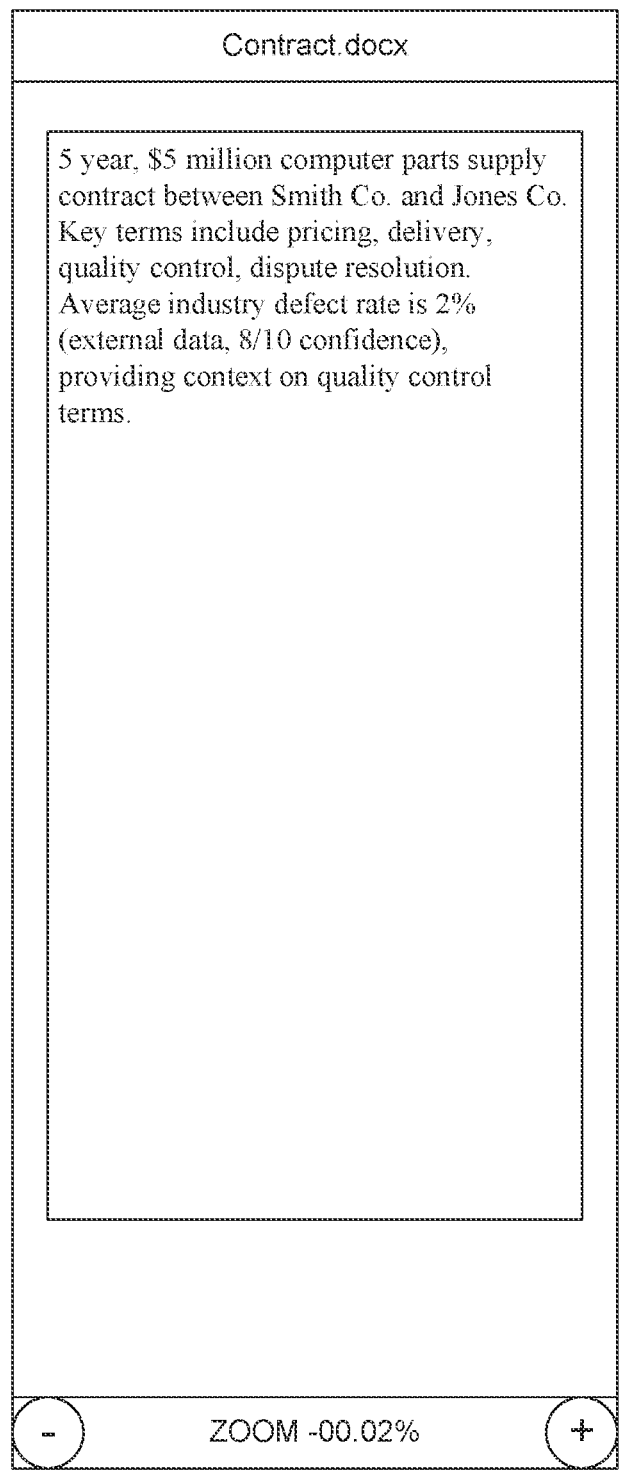
Figure 5E:
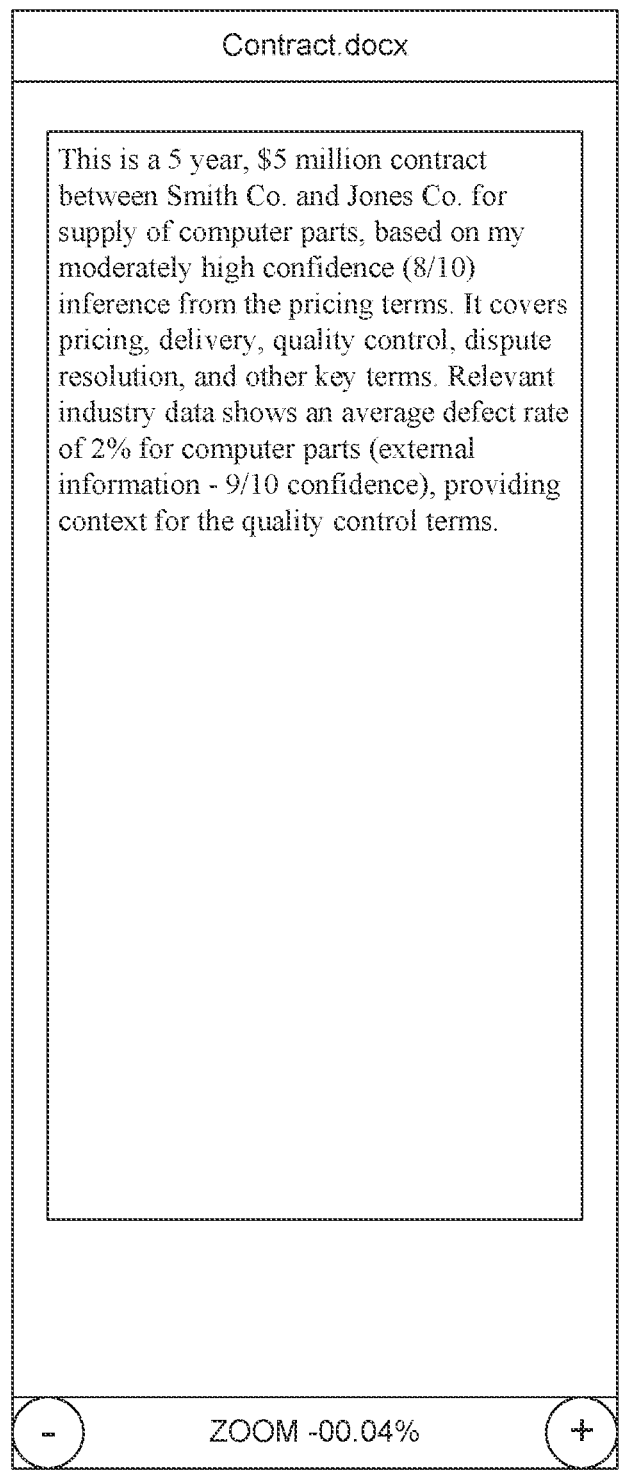

FIGS. 5A-5D are a series of block diagrams depicting the example content comprising this legal document at multiple zoom levels in a user interface responsive to user input. For example, FIG. 5A is an example representation of the document at positive zoom level 1; FIG. 5B is an example representation of the document at positive zoom level 2; FIG. 4C is an example representation of the document at positive zoom level 3; FIG. 4D is an example representation of the document at negative zoom level 1; FIG. 4E is an example representation of the document at negative zoom level 2.

Example: Sales Call

Transcript of a 30 minute sales call between a sales representative and prospective client discussing the client's business needs and how the representative's company's software products can address them.

Here is an example of how the system may be configured to operate when applied to content involving a sales call. Assume the content to which the system is applied is a transcript of a 30 minute sales call between a sales representative and prospective client discussing the client's business needs and how the representative's company's software products can address them.

Key topics covered:
    Client's existing IT infrastructure and pain points
    Client's goals for new software—cost reduction, time savings, increased efficiency
    Details on three software products offered by sales rep's company
    Pricing, implementation timeline, and trial options
    Next steps for moving forward with purchase
    Key topics covered:
    Client's existing IT infrastructure and pain points
    Client's goals for new software—cost reduction, time savings, increased efficiency
    Details on three software products offered by sales rep's company
    Pricing, implementation timeline, and trial options
    Next steps for moving forward with purchase The system may be configured to automatically determine the most appropriate zoom levels and/or abstraction levels for the most likely uses of the system with respect to the content item (e.g., by prompting the LLM), generate corresponding prompts for each determined zoom level, and return the responses to each of the prompts.

Positive Zoom Levels
    100% —Prompt. Full transcript restatement (4,000 words)
    Response: The full transcript.
    75% —Prompt: Restate the key discussion points in the sales call in 500 words:
    Response: The sales representative discussed Acme's order management software and CRM system with the prospective client, who runs an ecommerce company selling electronics online. They reviewed the client's pain points around managing a complex multi-channel sales process and inventory with high order volumes. The rep proposed Acme OMS and CRM as solutions, highlighting capabilities like order routing, inventory linking, reporting, and customer profiles. The client seemed interested but wanted ROI projections before committing.

50% —Prompt: Summarize the sales call in 250 words:
    Response: This was an exploratory sales call between an ecommerce company and a software firm to discuss solutions for the client's order management and CRM needs. The client outlined challenges with high order volume across multiple sales channels. The sales rep proposed their OMS and CRM software as options, highlighting key capabilities. The client will consider ROI projections before making a decision.

25% —Prompt: Identify the key parties, topics, and outcome in 100 words:
    Response: A sales rep from a software company discussed order management and CRM solutions with a prospective ecommerce client. The client has challenges with multi-channel order volume. They will assess ROI before deciding on the proposed software options.

10% —Prompt: State the purpose in 50 words:
    Response: Introductory sales call to explore order management and CRM software solutions for an ecommerce company's business needs.

−10% Prompt: Summarize this sales call between a software company sales representative and an ecommerce company prospect in 50 words. Then make 2 inferences about potential concerns the prospect may have that were not directly stated in the call, and rate your confidence level for each inference from 1-10 with 10 being most confident.

−10% Response:
    Introductory sales call to explore order management and CRM software solutions for an ecommerce company's business needs. The client may be concerned about high costs of software implementation (confidence: 8/10). The client may worry about integrating new systems with their legacy platforms (confidence: 6/10).

−25% Prompt: Summarize this sales call in 100 words. Then bring in 3 pieces of external data to provide relevant industry context, cite your sources, and rate your confidence in each data point from 1-10.

−25% Response:
    Introductory sales call to explore order management and CRM software solutions for an ecommerce company's business needs. The client may have concerns about costs and integration. Per Gartner, the average OMS implementation costs $100 k-$500 k (confidence: 9/10). Forrester reports that 67% of ecommerce companies use homegrown order management systems (confidence: 8/10). A McKinsey survey found that OMS integration was a top challenge for 75% of retailers (confidence: 7/10).

Example Server Architecture

An example server architecture focuses on low-latency, scalable summarization and abstraction capabilities.

Global Load Balancing

A DNS-based global load balancer routes users to the closest healthy region worldwide based on geography and real-time health checks.

This minimizes latency by directing users to nearby regions. Traffic is distributed evenly across regions to prevent hotspots.

Automatic failover provides resilience if a region goes down. For example, APAC traffic can be routed to AWS Asia Pacific servers or Google Cloud Tokyo during an AWS Mumbai outage.

Global load balancing is critical for a consistent low-latency user experience worldwide and handling failures gracefully.

Regional Deployment

Core services are deployed to strategic geographic regions like US West, Europe, Asia, South America etc. Availability zones within each region provide redundancy.

Regional deployments ensure nearby access for users in each locale to reduce network latency. This is essential for responsive UIs.

It also enables meeting data residency laws by keeping regulated data like EU personal data within country borders. For example, a bank can deploy services in Germany to store customer data locally.

Being distributed across global regions provides fault tolerance if an entire region goes down. Traffic can shift to the next closest region.

Auto Scaling

Container orchestrators like Kubernetes automatically scale core services like summarization, search and storage horizontally to meet demand spikes and capacity needs.

Consistent hashing distributes load across new instances as they are added. Queueing buffers requests during sudden spikes above current capacity.

For example, GPU nodes for machine learning inference can scale out within minutes to handle an influx of concurrent summarization requests without slowing down response times.

Autoscaling improves cost efficiency by adding resources on demand instead of overprovisioning for peak usage. It also maintains low latency during traffic surges.

Caching

In-memory caches like Redis cache frequently accessed results like pre-computed summaries, question-answer pairs, user profile data etc. to reduce database load.

Cache keys incorporate hashes of request parameters for uniqueness. Cache invalidation strategies handle updates.

For instance, an abstractive summary of a trending news article can be cached globally to handle the spike in readers. Returning the cached summary reduces processing overhead.

Caching improves response times and throughput dramatically while saving compute costs, especially for repetitive requests. It is indispensable for performance and scalability.

Asynchronous Processing

Message queues like Kafka decouple and scale backend processing like summarization. Web servers quickly return requests and consume asynchronous results.

Dead-letter queues isolate malformed messages. Retry logic handles transient failures. If summarization spikes, requests queue up instead of overloading services.

For example, a sudden influx of requests can be queued for smooth back-end processing instead of overwhelming servers. The queues absorb variability in traffic.

Asynchronous processing improves responsiveness for users and reliability for distributed services by smoothing out traffic spikes.

Polyglot Persistence

SQL databases like PostgreSQL store relational data like users, content metadata, API keys. NoSQL databases like MongoDB store non-relational data like configurations, feature flags. Blob storage holds unstructured data like documents, summaries. In-memory databases like Redis provide ultra-fast lookup cache.

Polyglot persistence uses optimized data stores for each access pattern, structure and performance requirement instead of a one-size-fits-all approach.

For instance, frequently accessed summaries can be served from Redis for sub-millisecond latency instead of scanning slower disk-based databases.

Choosing appropriate storage technologies for each data type and use case improves performance, scalability and developer productivity.

Service Orchestration

Container orchestrators like Kubernetes handle deployments, autoscaling, failovers, rolling updates and rollbacks across environments.

For example, canary deployments shift a percentage of traffic to new versions to test changes before rolling out globally. Failed releases are automatically rolled back.

Service meshes manage communications between microservices including load balancing, encryption, authentication etc.

Orchestration automates and simplifies running a distributed microservices architecture across dynamic infrastructure. This reduces operational complexity.

Monitoring

Time-series databases like Prometheus collect real-time metrics on performance, capacity, errors etc. Grafana dashboards visualize trends.

Logs are aggregated in search engines like Elasticsearch. Distributed tracing correlates logs across microservices. Alerts notify teams about issues.

For instance, a spike in 95th percentile summarization latency can trigger an alert to investigate potential problems before user experience is impacted.

Holistic monitoring provides visibility into the health and performance of the entire system, not just individual components. This is essential for diagnosing issues across distributed architectures.

AB Testing

New models and UI features are tested on a percentage of traffic before rolling out globally. Performance and usage data guide incremental improvements.

For example, a new deep learning summarization model can be evaluated against the existing model by routing 1% of traffic to it. The better performing model is then rolled out fully.

AB testing allows validating changes scientifically before amplifying potential issues to all users. This reduces risks from deployments.

Security

Firewall policies restrict traffic between microservices. API requests are authenticated and authorized. Communications are encrypted end-to-end.

Static analysis finds vulnerabilities in code. Dynamic scanning continuously tests production environments for risks.

For instance, new CVEs are monitored and patched quickly based on severity. Penetration testing uncovers potential attack vectors to address.

Communications between the summarization microservices may be encrypted end-to-end (e.g., using TLS 1.2+) to prevent eavesdropping or data tampering during transmission In-depth defense protects the confidentiality, integrity and availability of systems against threats. This builds trust.

Compliance

Regional data controls, encryption, access controls, auditing etc. meet localization requirements like GDPR, CCPA.

Certifications like SOC2 and ISO 27001 validate security and privacy controls through external audits.

For example, right to access and delete personal data can be provided to EU residents as per GDPR. Audits ensure controls are maintained over time.

Adhering to compliance standards reduces legal risk, enables global operation, and reassures customers on privacy and security.

Summarization Services

Specialized microservices provide scalable summarization capabilities optimized for low latency.

API Gateway

The API gateway handles cross-cutting concerns of API management:

Authentication—integrate OAuth, API keys, JWT etc. to secure API access

Rate limiting—prevent abuse like DDoS by limiting requests per user

Caching—reduce backend load by caching common query results

Metrics—track API usage statistics for analytics and monitoring

CORS—allow cross-origin browser requests to APIs

Consolidating shared logic reduces code duplication across services. A gateway encapsulates APIs behind a consistent facade.

Request Router

The router dispatches incoming summarization requests to appropriate backend services based on:

User locale—route to nearby region for lowest latency

Content type—select specialized model for audio, video, text etc.

Required SLA—route urgent requests to fast GPU cluster

This enables optimizing the tradeoffs between latency, accuracy and cost on a per-request basis.

For example, a breaking news summary can be routed to the fastest GPU servers to return key highlights within seconds to readers.

Model Selection

This service consults the global model registry to select the optimal summarization model for each request based on:

Content type—scientific paper, tweet, meeting transcript etc.

User reading level—vocabulary expertise, non-native language etc.

Use case—overview, key details, visual summary etc.

Choosing the right model improves accuracy. For instance, a legal contract can leverage a model fine-tuned on thousands of legal documents to better identify key clauses using precise terminology.

Abstractive Summarization

Transformer-based deep learning services generate abstractive summaries by condensing long input texts into shorter versions in new phrasing.

Key techniques include paraphrasing, generalization, sentence fusion and compression while preserving semantic meaning.

Abstractive summarization is great for delivering concise overviews of lengthy content. For example, condensing a long research paper into a 250-word abstract highlighting key contributions.

Extractive Summarization

These services apply rules and heuristics to identify and extract key representative sentences from documents to assemble summaries.

For instance, a news article can be summarized into bullet points of key facts by extracting salient sentences that cover the main topics.

Extractive methods work well for gathering highlights or identifying important details in structured documents.

Query Module

This module takes a user's clarifying question on a summary and invokes conversational QA services to expand the summary by answering the question.

It composes an enhanced summary integrating the relevant facts. For example, appending the CEO name by answering "Who is the CEO of Company X?".

Allowing users to interactively probe for more details improves understanding.

Compression Module

This service compresses expanded summaries from the Query Module back into more concise overviews by removing redundant or low-relevance information.

Compression algorithms include sentence fusion, paraphrasing, generalization etc.

For instance, a detailed 1000 word summary can be compressed down to a 200 word overview by consolidating overlapping details.

Compression condenses summaries to desired lengths after they have been expanded through user querying. This improves focus.

Summarization Database

A managed cloud database like BigQuery efficiently stores pre-computed extractive and abstractive summaries, indexed by content signatures for low-latency retrieval.

For example, summaries of trending articles can be generated in advance and served directly from the database instead of on-demand processing.

Caching summarization outputs improves responsiveness and cost-efficiency for common queries. Storing all past summaries also enables analytics.

Orchestration

Streamlined orchestration coordinates the summarization pipeline for optimized performance.

Message Queueing

A message broker like Kafka connects the sequence of microservices that comprise the summarization workflow—cleaning, extraction, abstraction, compression, storage etc.

This enables asynchronous processing and buffering between stages to smooth out load spikes. Dead-letter queues isolate malformed messages.

For instance, an extractive summarization request could fail repeatedly due to poor text quality. The dead-letter queue would catch the retries instead of blocking the pipeline.

Message queueing provides scalability, resilience and restartability for long-running multi-stage summarization pipelines.

Pre-Processing

Raw input documents are cleaned, parsed, segmented, tokenized etc. to normalize them for downstream summarization steps.

Taxonomy classifiers also tag documents with subject categories. For example, identifying key terms and taxonomy tags for a scientific paper.

Pre-processing improves summarization accuracy by structuring heterogeneous content into a standardized format.

Information Retrieval

Relevant external information is retrieved from databases, knowledge graphs and APIs to augment the context for summarization beyond what is contained directly in the source document.

Access limits prevent abuse. Any retrieved information is summarized recursively to condense it down to key facts.

For instance, a clinical trial summary could pull related research from medical databases to provide broader scientific context.

Adding contextual references results in richer, more informative summaries.

Post-Processing

Generated summaries are formatted, compressed and enhanced post-generation based on parameters provided in the initial request like target length, prose style etc.

For example, an academic tone post-processor could edit a 250-word abstractive summary for clarity and concision appropriate for a research paper.

Post-processing adapts raw summarization outputs to user needs and preferences.

Output Storage

Completed summaries are persisted in a distributed object store indexed by document ID, date, length and other metadata like abstractiveness ratings from the compression module.

Storing past summaries enables auditing, reprocessing, analytics and continuously retraining summarization models on past examples.

For instance, multiple iterations of summarizing the same document could reveal how model improvements increase quality over time.

Durable storage of summary outputs and metadata improves analytics, compliance and model training.

Example Client Architecture

An example client architecture focuses on intuitive exploration and visualization of summarized content.

Web Application

The web app built with React, Angular etc. provides interactive exploration of document summaries. PWA support enables mobile installation.

For example, key passages and facts from a summarized legal contract can be browsed by zoom level. Hyperlinks provide context. Media is embedded.

The web app allows seamless, linked navigation across summarized documents using a rich responsive interface. This improves understanding of complex information.

Mobile Applications

Native iOS and Android apps allow power users to efficiently explore and annotate summaries anytime, anywhere.

Offline support enables uninterrupted usage in poor connectivity. Biometric login improves security.

For instance, a consultant could review summarized client reports and research papers during commutes to prepare recommendations.

By providing quick access from mobile devices, native apps integrate summarization into daily workflows.

Browser Extension

This extension lets users summarize web articles with highlights and annotations. Summaries are synced across user devices.

Remote summarization reduces local compute usage. For example, generating a summary of key insights while browsing news and social media feeds.

Integrating summarization into the browsing experience allows users to absorb information rapidly as they consume content online.

Document Editor Integration

Add-ins for Microsoft Word, Google Docs etc. integrate summarization into content creation workflows.

For instance, writers can summarize long report drafts into executive overviews and check for conciseness—all within the editor.

Tight integration into popular tools like Word and Google Docs removes friction from leveraging summarization while authoring documents.

Email Integration

Browser buttons and email client add-ins summarize long emails and threads into concise overviews right within the inbox.

For example, rambling customer complaint emails can be summarized into coherent issue summaries highlighting actionable information.

Email integration brings summarization directly to a common productivity workflow where overload is frequent.

API Clients

Client SDKs simplify calling summarization, search and analytics APIs from mobile and web apps. They handle authentication, queuing, retries etc.

For instance, an iOS app could use a Swift SDK to summarize articles from a news API.

Generated API clients accelerate building custom summarization integrations on any platform.

User Interface

The UI adapts to provide an optimal user experience across contexts ranging from mobile to desktop.

Responsive Design

UI components gracefully adapt across different browser and device sizes. Information density increases with screen real estate.

For instance, on mobile taps would expand summary sections instead of hover. Inputs adapt to touch interactions.

Responsive design provides a consistent experience optimized for the user's current device.

Progressive Disclosure

Detailed information is initially hidden but can be revealed through interactions like tapping expand icons and 'Show more' links.

This focuses attention on key information while allowing access to more depth on demand.

Progressive disclosure balances concision and depth based on user needs.

Interactive Visualizations

Rich visualizations like charts, graphs and maps let users explore data relevant to summaries. Filters change the displayed data.

For example, an interactive entity relationship graph could visualize connections between key people and organizations mentioned in a summary.

Visualizations complement content summaries with visual overviews and drill-down exploration. This provides broader understanding.

Natural Language Interactions

Conversational interfaces allow querying summaries in natural language to get clarifications, definitions and contextual expansion.

For instance, "Who funded this research?" could be answered by the knowledge extraction module to enrich a summary.

Natural language interactions enable efficient follow-up to summarize information relevant to user questions.

Customization

User preferences like default summary length, vocabulary level, text vs audio etc. adapt outputs to user needs and contexts.

For example, generating Japanese language summaries of English content could aid non-native speakers.

Customization allows personalizing summarization to improve individual understanding.

Accessibility

Screen reader support, captions, keyboard shortcuts, text resizing enable access for users with disabilities.

For instance, audio summaries could assist visually impaired users.

Accessibility features ensure summarization capabilities are available to all users.

Example Integrations and/or Plug-Ins

Email Summarization

Email summarization integrations help users digest long, complex email threads and messages by generating concise overviews.

Browser extensions can activate summarization on email messages in webmail clients. Summarize buttons generate key details and talking points from long threads with a single click.

Similarly, productivity plugins (e.g., for Outlook, Gmail and/or other desktop clients) may let users summarize messages and conversations without leaving their client application.

Email text is extracted using DOM scraping or email client APIs. Server-side processing summarizes the content rapidly with minimal local resource usage.

Summaries are presented inline, in side panels, or as new draft messages summarizing the thread. Important context is retained while focusing on relevant details and action items.

Web Browser Extension

This browser extension lets users summarize webpages through highlights, annotations and overlays as they browse and read content online.

Browser buttons activate summarization on the current page. JavaScript content scripts extract page content. Background scripts interface with the summarization API.

Generated summaries are overlaid on the page or side panel as text highlights, comments, and visual annotations. Users digest online information more efficiently.

Summaries are synced to the user's account so they are accessible across devices. Remote processing reduces client resource usage.

Document Editor Plugins

Integrations with Microsoft Word, Google Docs, and other document editors bring summarization directly into content creation workflows.

Plugin buttons help writers summarize long documents into concise overviews to improve clarity and structure. Interactive edits integrate insights back into the document.

Writers can optimize draft relevance, check for redundancy, and accelerate research synthesis. Summaries aid productivity within existing writing tools.

Text is extracted through editor APIs. Summaries are displayed in side panels linked to source sections. Cloud sync maintains access across devices.

Mobile Applications

Native iOS and Android apps enable users to efficiently explore, annotate and share summaries anytime, anywhere.

Offline support allows uninterrupted usage with local storage and processing. Biometric login improves security. UI/UX is optimized for mobile usage.

Researchers can review papers during commutes. Analysts can update reports poolside. Summarization fits mobile lifestyles.

API Access

Cloud platform APIs allow partners to integrate summarization into their own products via SDKs and turnkey solutions.

Integration interfaces (e.g., REST APIs) may enable programmatic summarization at scale. Client libraries may simplify integration across diverse programming languages and platforms. Usage analytics and billing components may meter summarization usage for tracking and monetization.

Partners can extend summarization to new industries and workflows. Custom solutions are tailored to specific needs.

Dashboard Integrations

Summarization integrations with business intelligence tools like Tableau allow users to get high-level overviews of data insights through interactive dashboards.

Data extracts are summarized into key trends, patterns, and observations. Users click through to drill down into details.

Executives can grasp key takeaways from extensive reports efficiently. Analysts simplify data communication.

Presentation Assistants

Plugins for PowerPoint and Keynote help presenters summarize long reports into slide decks highlighting key points, findings and recommendations.

Presenters can rapidly build decks from documents through automatic content extraction, summarization and slide generation.

Talking points keep presentations focused and concise. Quick slide creation saves hours of manual effort.

Research Tools

Reference manager integrations like Mendeley summarize academic papers to accelerate research and literature review.

Scholars can rapidly survey papers to evaluate relevance before deciding whether to read the full text. This filters content faster.

Citations and academic metadata are extracted to streamline bibliography management. Key contributions are summarized to guide reading priority.

Learning Management Systems

Integrations with Canvas, Blackboard and other LMS platforms help instructors and students manage reading assignments through automatic summarization.

Instructors can summarize lecture transcripts, texts and course materials to focus student attention on key concepts. Students can summarize readings into study notes.

Automated summarization saves time while enhancing understanding of core course content.

how the system can automatically evolve its core functionality with minimal developer intervention:

Example System Evolution

In example embodiments, the system can progress automatically from basic request passing to an automated summarization platform having one or more of the more advanced features discussed herein, using, for example, one or more of pre-defined templates, rules, evaluations, and/or optimizations requiring minimal hand-tuning.

Developers or administrators may configure the system upfront to automatically handle prompting, iteration, transparency, customization, orchestration and integration.

The system applies the pre-defined logic and workflows to each request without manual intervention. This enables automatically evolving summarization capabilities with low maintenance overhead.

This automated approach allows the system to scale while adapting to diverse use cases and content types without per-request developer involvement. One-time configuration rather than ongoing tuning may unlock the platform's full functionality.

Automated Simple Request Handling

Initially, the system may be configured to handle simple summarization requests in an automated way with no customization. Clients may send requests like the following:

POST/summarize
{
"content": " . . . ",
"abstraction_level": 50%
}

The system may then automatically pass these requests to a large language model (LLM) API. The LLM returns a summary, which the system sends back to the client without additional processing.

This simple request/response flow enables out-of-the-box summarization without developer work. The system acts as a hands-off pass-through to the LLM.

Automated Prompt Engineering

To improve quality, the system can automatically construct prompts engineered for the LLM vs just passing raw requests.

For example, the system may be pre-configured with templates for common summarization tasks like:
Summarize article into 200 word overview;
Extract key points from report in bullet list; and/or
Explain concepts from textbook chapter simply.
Based on the request parameters, the appropriate template is selected and populated with the content.

For example, a 50% abstraction request may automatically choose the 200 word overview template. The content is inserted and automatically prompted to the LLM without developer intervention.

The templates may contain instructions tailored for different summarization goals to guide the LLM. The automated prompting improves quality without manual effort.

Automated Iterative Refinement

The system can automatically refine summaries by iteratively re-prompting the LLM.

The developer configures iterative refinement rules like:
Repeat 3 times;
Reduce length by 20% each iteration; and/or
Focus on most frequent concepts.

The system then applies these rules to automatically re-prompt the LLM with its previous output and refine the summary. No ongoing developer work is needed.

For example, here is a pseudo-code example that demonstrates automatic prompt re-generation for increasing abstraction levels:
Set initial abstraction %
Set initial prompt using template A
Send prompt to LLM API and get summary
While abstraction % <target:
Increase abstraction %,
Select template matching new abstraction %,
Populate template with prior summary
Send updated prompt to LLM API
Get new summary
Return final summary In example embodiments, the system is configured to use such a loop to iteratively re-prompt the LLM API with templates designed for higher abstraction levels each iteration.

The templates may control phrasing, instructions, and content provided to adjust the abstraction in a step-wise manner. The LLM output summary may then be used as the content for the next iteration's increased abstraction prompt.

Automated Negative Abstraction

For negative abstraction levels, the system is pre-configured with inference and external data request templates.

When a negative abstraction percentage is received, the appropriate template is selected and populated into a prompt for the LLM. For example:
"−20% level ->Automatically select 'Request 2 relevant industry facts' template"

The LLM may integrate external data and inferences without developer intervention based on the pre-defined templates.

Automated Configurable Abstraction

The system enables developers to define configurable abstraction rules like:
Compress descriptive paragraphs by 50%;
Retain key numbers verbatim; and/or
Allow 2 inferences per −10% level The defined rules are then automatically applied to construct prompts tailored to the request. Configurability is exposed without ongoing manual effort.

Automated Transparency

The system can automatically generate transparency in the LLM output by configuring prompt templates that elicit explanations.

For example, a prompt template may specify:
"For each inference, include a 3-sentence rationale and confidence rating."

The LLM will then automatically generate transparency information when prompted without additional developer work.

Automated Evaluation

The system enables developers to define automated evaluation metrics and decision rules like:
Reject if grammar errors >5;
Retry if compression rate threshold unmet; and/or
Sample 1% of outputs for human review The defined evaluations are then automatically applied to each summary without ongoing involvement. This provides quality control without manual intervention.

Automated Orchestration

The end-to-end workflow is defined upfront by the developer as a sequence of pre-configured modules like:
Receive request;
Select prompt template;
Iterate on LLM summary;
Retrieve external data;
Generate transparency;
Evaluate summary; and/or
Return summary.

The orchestration automatically coordinates the modules based on the initial configuration without further developer work needed.

Automated Customization

The system enables developers to create customization rules like:
Legal docs: Retain parties, dates, citations;
Emails: Summarize in casual tone; and/or
Reports: Focus on trends and metrics;
These rules automatically tailor summarization without per-request involvement. Customization is handled upfront.

Automated Optimization

The system provides pre-defined optimization capabilities like:
Caching API for precomputed summaries;
Horizontal autoscaling of LLM fleet;
Asynchronous batching based on load; and/or
Indexing for low latency retrieval.

The appropriate optimizations are automatically applied behind the scenes based on the system state and request volume without ongoing developer tuning.

Automated Integration

The system may offer integration APIs and SDKs to leverage the summarization automatically in other applications, including, for example:
Integration interfaces, such as those implemented in performant programming languages like Node.js and Java, for high performance and scalability
Webhook subscriptions for summary notifications;
Embeddable widgets for key platforms; and/or
Documentation with samples and best practices.

Minimal integration code is needed to benefit from the automated summarization capabilities.

Example End-User Use Cases

Reviewing Legal Documents

A lawyer could utilize the system to quickly summarize lengthy contracts, case files, and legal briefs into concise overviews for review on their phone. Key clauses, precedents, and conclusions are extracted without having to read pages of dense legal jargon on a small screen. The lawyer can zoom in on critical sections for details.

Researching Academic Papers

A student researcher can leverage the system to summarize long academic papers into brief summaries highlighting the key contributions, results, and conclusions. This allows rapidly surveying papers on a mobile device to determine relevance before committing to a full read. Abstracts are tailored to the student's level of expertise.

Catching Up on News

A busy professional can use the system to get compact summaries of the day's top news stories optimized for reading on their phone during their commute. The most important facts and developments are extracted from lengthy articles. Summaries are refined to different lengths based on available time.

Reviewing Financial Filings

An investor can summarize long earnings reports and regulatory filings into key takeaways to make investment decisions on the go. The system condenses financial metrics, management commentary, and industry trends into actionable insights viewable on a small screen.

Getting Meeting Notes

A remote worker can input the raw transcript of an lengthy client meeting into the system to automatically generate summarized meeting minutes optimized for mobile review. This saves time compiling notes manually. The worker can share the condensed version with colleagues.

Studying Lecture Slides

A student can upload their professor's lengthy slide decks into the system to create condensed study guides for exam prep on their phone. Important concepts and examples are extracted while removing redundant or peripheral information from the raw slides.

Planning Travel Itineraries

A traveler can summarize long travel guides and reviews for destinations into day-by-day itineraries with highlights optimized for quick mobile reference. This condenses trip planning complexity into an easy-to-use format.

Reviewing Medical Records

A doctor can summarize lengthy patient medical histories into condensed overviews for reference on their phone when visiting patients. Negative zoom can expand details by inferring missing diagnosis dates based on medication timelines and incorporating relevant external data like clinical trial results. This provides richer context.

Analyzing Survey Results

A market researcher can distill key insights from lengthy survey result reports using positive zoom for high-level overviews. Negative zoom can pull in related demographic data to add context about the survey population. This augments understanding of the results.

Understanding Policies

A lawyer can get concise summaries of long regulatory policies on their phone using positive zoom. Negative zoom can infer potential compliance implications not directly stated and bring in external data about related regulations. This reveals deeper analysis.

Reviewing Scientific Papers

A scientist can quickly summarize dense journal articles to evaluate relevance on a mobile device. Negative zoom can expand by drawing connections between papers and adding supplemental findings from preprint servers. This enables more thorough review.

Studying Financial Models

An MBA student can condense lengthy financial model descriptions into key parameters and equations using positive zoom. Negative zoom can infer sensitivity assumptions not specified and link to external market data used. This provides useful modeling context.

An executive can summarize long reports into concise talking points using positive zoom. Negative zoom can suggest additional implications and facts to cover based on the executive's knowledge profile. This helps customize remarks.

Here are some additional use cases, including extreme negative zoom:

Analyzing Social Media Trends

A marketing analyst can get high-level overviews of social media conversations using positive zoom. With extreme negative zoom, speculative insights are generated about viral meme origins and influencer motivations based on their profiles. This reveals deeper trends.

Reviewing Case Notes

A lawyer can summarize lengthy case notes into key details with positive zoom. Extreme negative zoom can hypothesize potential missing details based on case law precedents and bring in comprehensive background on involved parties from various public records. This connects the dots.

Understanding AI Research Papers

An engineer can simplify dense AI papers using positive zoom. Extreme negative zoom can expand by linking to lightly related concepts and surfacing peripheral citations. This provides broader scientific context.

Evaluating Business Plans

A venture capitalist can distill lengthy funding applications into key metrics and claims using positive zoom. Extreme negative zoom can speculate on risks and growth trajectories while incorporating financial data on competitors. This provides more thorough evaluation.

Studying Ancient Texts

A scholar can simplify archaic language with positive zoom. Extreme negative zoom can hypothesize authorship details based on stylistic analysis and incorporate a wide range of loosely associated historical facts and artifacts. This reveals deeper insights.

Planning Vacations

A traveler can get high-level overviews of destinations with positive zoom. Extreme negative zoom can pull in supplemental sights based on related blogs and local events based on tourism data. This enriches trip planning.

The system reduces friction associated with digesting or referencing long, complex documents on small mobile screens. Key information is extracted on demand for easy review and sharing on the go. Negative zoom allows users to expand beyond the source content through inferences and external data integration even on mobile devices. This augments understanding while still optimizing for on-the-go use. Extreme negative zoom allows generating speculative insights and incorporating tangential external data to reveal a bigger picture view of the content.

Example Corporate Use Cases

Analyzing Customer Feedback

The customer support team of a large retailer can use the system to summarize long complaint tickets and feedback surveys submitted by customers.

Positive zoom helps extract key pain points and common grievances from lengthy descriptions into actionable insights.

Negative zoom can incorporate external data to add context—e.g. pulling in customer satisfaction benchmarks for the industry to evaluate feedback.

This helps the company identify systemic issues and improvements to products, policies, and services to enhance customer satisfaction.

Reviewing Business Reports

The senior management of a manufacturing firm can leverage the system to summarize lengthy quarterly business review (QBR) reports from each department.

Positive zoom distills key metrics, trends, takeaways, and recommendations into executive summaries.

Negative zoom can infer likely forward-looking impacts and bring in external production and macroeconomic data to enrich insights.

This enables executives to efficiently digest QBRs and make data-driven strategic decisions.

Processing Insurance Claims

Claims processors at an insurance company can use the system to summarize lengthy incident reports and supporting documents into condensed case summaries highlighting key details.

Positive zoom focuses on core facts like dates, property damage, claimants involved, and requested payouts.

Negative zoom can incorporate related claims data to detect potential fraud patterns and extract insights.

This allows rapidly compiling case details to expedite claims processing and improve fraud detection.

Reviewing Financial Statements

The finance team at a public company can use the system to summarize lengthy quarterly and annual financial statements into executive overviews.

Positive zoom focuses on key metrics like revenue, profits, cash flow, debts, and guidance.

Negative zoom can analyze historical trends and growth drivers while incorporating external market and industry data for context.

This enables efficiently distilling critical details from complex regulatory filings into actionable insights.

Processing Insurance Claims

Doctors at an insurance company can leverage the system to summarize lengthy medical records and exam notes to compile condensed patient health histories.

Positive zoom extracts critical information like past conditions, surgeries, medications, test results, and diagnoses.

Negative zoom can infer likely missing details from doctor notes and incorporate medical research on conditions as supplemental context.

This helps streamline compiling health backgrounds to facilitate claims processing and auditing.

Evaluating Research Papers

Scientists at a pharmaceutical company can use the system to summarize lengthy academic research papers related to drug discovery and development.

Positive zoom highlights key findings, methods, implications, and conclusions from dense technical writing.

Negative zoom can draw conceptual connections between papers and surface peripheral citations as additional context.

This enables efficiently evaluating research relevance to drive drug pipeline decisions.

Example Government Use Cases

Analyzing Intelligence Reports

Intelligence analysts can leverage the system to summarize lengthy classified reports into concise overviews of key findings, patterns, and recommendations.

Positive zoom provides high-level situational awareness and surfaces critical insights from massive documents.

Negative zoom can infer connections between disparate reports and incorporate loosely related external data to detect broader trends.

This augments analysis of complex geopolitical situations to enhance national security.

Reviewing Legal Cases

Government lawyers can use the system to summarize lengthy case files and legal briefs to identify core arguments, precedents, evidence, and conclusions.

Positive zoom focuses on the key facts and testimony most relevant to the case.

Negative zoom can hypothesize the implications of different rulings and bring in related past cases and laws as additional context.

This allows efficiently prioritizing critical case details to prepare for hearings and trials.

Processing Patent Applications

Patent examiners can leverage the system to summarize lengthy patent applications into concise overviews of the proposed invention, prior art, claims, diagrams, and descriptions.

Positive zoom extracts the key novel features and differentiators of the invention.

Negative zoom can draw connections to loosely related patents and incorporate expert knowledge to evaluate patentability.

This enables rapidly understanding the essence of complex patent applications to streamline review.

Summarizing Bills and Amendments

Policy advisors can leverage the system to summarize lengthy legislative bills and amendments into concise overviews.

Positive zoom focuses on critical details like sections amended, funding allocated, programs impacted, and implementation timelines.

Negative zoom can infer wider implications and incorporate related regulations as additional context.

This provides efficient understanding of complex legislation changes to advise elected officials.

Reviewing Grant Proposals

Government grant officers can use the system to summarize lengthy grant applications into condensed summaries highlighting goals, methods, qualifications, budgets, and impact.

Positive zoom extracts key differentiating factors between competing proposals.

Negative zoom can infer potential challenges and incorporate related external data to better evaluate proposals.

This enables thoroughly yet efficiently reviewing many complex proposals to determine awardees.

Analyzing Public Comments

Regulators can leverage the system to summarize lengthy public feedback received during rulemaking comment periods.

Positive zoom focuses on extracting key themes, suggestions, and concerns from repetitive or redundant comments.

Negative zoom can infer overall public sentiment and bring in related regulatory background as context.

This helps efficiently process high volumes of public input to shape effective regulations.

Example Journalistic Use Cases

Live Event Summarization

News media analysts can leverage the system to generate real-time summaries of unfolding events like elections, sports matches, and awards shows.

As new information comes in through live blogs, social media, wire feeds, and other sources, the system can ingest and summarize content in real-time.

Positive zoom identifies key developments, statistics, quotes, and highlights as they occur.

Negative zoom can make speculative predictions on likely outcomes as events progress based on historical data and expert knowledge.

Additionally, it can pull in related contextual information on candidates, players, nominees, etc. to augment understanding.

With real-time input and summarization, the system can output a condensed overview of the live event as it unfolds to keep analysts instantly informed.

The low-latency real-time capabilities allow analysts to efficiently monitor many unfolding events simultaneously without getting overwhelmed.

Key metrics and insights are extracted and speculated upon as soon as new information appears, enabling rapid response and commentary.

Without real-time processing, there would be a lag in ingesting inputs and producing summarized outputs. This would severely limit the utility for time-sensitive live event monitoring and analysis use cases requiring instant summarization.

Summarizing Raw Interviews

Investigative journalists can use the system to summarize lengthy raw transcripts and audio recordings from interviews with sources into condensed overviews.

Positive zoom extracts key quotes, facts, and allegations to capture the essence.

Negative zoom can infer potential bias in sources based on speech patterns and incorporate related investigative data to augment insights.

This helps efficiently distill interview content to inform news stories and documentaries.

Reviewing Documents

Reporters can leverage the system to summarize lengthy documents like financial reports, court documents, and policy whitepapers obtained during investigations.

Positive zoom focuses on highlighting critical revelations, figures, and conclusions.

Negative zoom can make speculative connections to other documents and surface potential leads for further pursuit based on the reporter's notes.

This enables rapidly analyzing investigation materials to shape reporting.

Example Academic Use Cases

Summarizing Lectures

Professors can use the system to summarize lengthy written lectures and textbook chapters into condensed study materials for students.

Positive zoom extracts core concepts, examples, and conclusions while removing redundant or peripheral information.

Negative zoom can infer foundational knowledge students should have and incorporate illustrative external materials to enhance explanations.

This helps create optimized condensed lectures and study guides tailored to the needs of the students.

Analyzing Research Corpus

Academic researchers can leverage the system to analyze large corpora of documents in their field like conference proceedings and journal articles.

Positive zoom helps identify key themes, findings, and gaps in the literature.

Negative zoom can uncover underlying connections between papers and surface rising scholars to watch.

This provides efficient understanding of the high-level landscape and trends in the field.

Miscellaneous Example Use Cases

Summarizing Art History Materials

Art historians can leverage the system to summarize lengthy articles, books, and documentaries on art history into condensed overviews.

Positive zoom extracts key details on artists, movements, influences, techniques, and representative works.

Negative zoom can make connections between different periods and styles and incorporate peripheral contextual details to provide a big picture perspective.

This allows efficiently reviewing a large volume of art history resources to identify key themes and trends.

Analyzing Music Compositions

Composers can use the system to analyze lengthy scores or recordings of complex musical compositions to understand the key elements.

Positive zoom identifies the main melodies, harmonies, rhythms, instrumentation, song structures, and motifs that define the overall style and sound.

Negative zoom can infer less obvious patterns in the music and bring in contextual details on the composer, period, and genre to reveal deeper insights.

This helps composers efficiently grasp the essence of intricate compositions to inform their own work.

Reviewing Architecture Documents

Architects can leverage the system to summarize lengthy architecture plans, models, and proposals to extract key details.

Positive zoom focuses on spatial layouts, designs, materials, features, and concepts that shape the architecture.

Negative zoom can make speculative suggestions on modifications based on building requirements and incorporate external data like maps and zoning policies as additional context.

This enables quickly grasping the most important architectural elements amidst extensive documents.

Analyzing Comedy Performances

Aspiring comedians can use the system to summarize video recordings of standup specials and improv shows.

Positive zoom identifies key jokes, storytelling techniques, callback patterns, and comedic devices that get big laughs.

Negative zoom can infer subtler humor mechanics and incorporate biographical details on the comedians to reveal deeper insights.

Summarizing AI Research Papers

AI researchers can leverage the system to summarize lengthy academic papers on cutting-edge AI techniques and innovations.

Positive zoom highlights key algorithms, architectures, results, advantages, and limitations of proposed methods.

Negative zoom can draw conceptual connections between different papers and surface rising trends and paradigms in AI research.

This enables efficiently reviewing a high volume of complex technical papers to stay up-to-date on the state-of-the-art in a rapidly evolving field.

Analyzing VR/AR Applications

VR/AR developers can use the system to analyze extensive documentation and codebases of virtual reality and augmented reality applications.

Positive zoom extracts core user flows, 3D assets, scene designs, and key software architectural patterns.

Negative zoom can infer likely challenges in porting to new platforms based on hardware specifications and bring in contextual competitive benchmarking data.

This helps efficiently grasp the essence of complex VR/AR projects to aid maintenance, optimization, and multi-platform support.

Processing Sensor Data

Engineers can leverage the system to process and summarize real-time data streams from networks of IoT sensors monitoring infrastructure like factories, bridges, and wind farms.

Positive zoom identifies anomalies and critical events from noisy sensor readings.

Negative zoom can make predictive failure estimates based on historical trends and external weather data to enable predictive maintenance.

The real-time ingestion and summarization helps surface important insights from vast sensor data streams to optimize infrastructure monitoring.

Reviewing Neuroscience Studies

Neuroscientists can use the system to summarize lengthy papers on neural networks, brain-computer interfaces, and advanced neuroimaging techniques.

Positive zoom highlights key findings on neural behavior, cognition, and responses to stimuli.

Negative zoom can identify promising follow-up research directions based on unanswered questions and speculative extrapolation of results.

This enables staying current in the rapidly evolving field of neuroscience and related technologies.

This helps new comedians efficiently learn from performances to develop their own comedy skills.

Summarizing Legal Contracts

Lawyers can leverage the system to summarize lengthy, complex legal contracts into various levels of detail—from highly condensed overviews to clause-by-clause breakdowns.

The most granular positive zoom can extract specifics of terms, conditions, restrictions, liabilities, fees, and other fine details.

Progressively broader summaries move up from the granular clause level to summarize contract sections, whole documents, groups of related contracts, and entire agreements.

This multi-resolution summarization provides customized abstraction allowing efficient review of contracts from broad overview down to minute details.

Analyzing Source Code

Software engineers can use the system to analyze large codebases by summarizing at various levels—from high-level overviews of architecture to granular summaries of logic within functions.

Positive zoom can provide a hierarchical codebase abstraction, extracting design patterns, interfaces, modules, classes, and ultimately line-by-line logic flow.

Negative zoom can infer dependencies between components that may not be explicit.

The granular, multi-resolution summarization enables understanding complex code both broadly and deeply.

Summarizing Health Records

Doctors can leverage highly granular summarization of patient health records—from condensed medical histories to detailed timelines of symptoms, medications, and interventions.

The most granular positive zoom extracts specifics from individual progress notes, test results, and specialist reports.

Higher levels summarize across visits and sources into integrated chronological timelines and profiles of health factors.

This allows customized abstraction levels to efficiently analyze patient records from diverse sources.

Summarizing Scientific Data

Researchers can use the system to summarize raw scientific data sets into statistical overviews, data subset reports, visualizations, and granular listings.

Positive zoom can provide multi-resolution analysis—from high-level trends down to row-level data.

Negative zoom can analyze inter-variable relationships at varying granularity.

The customizable summarization supports exploring large complex data from diverse analytical perspectives.

Figure 6:
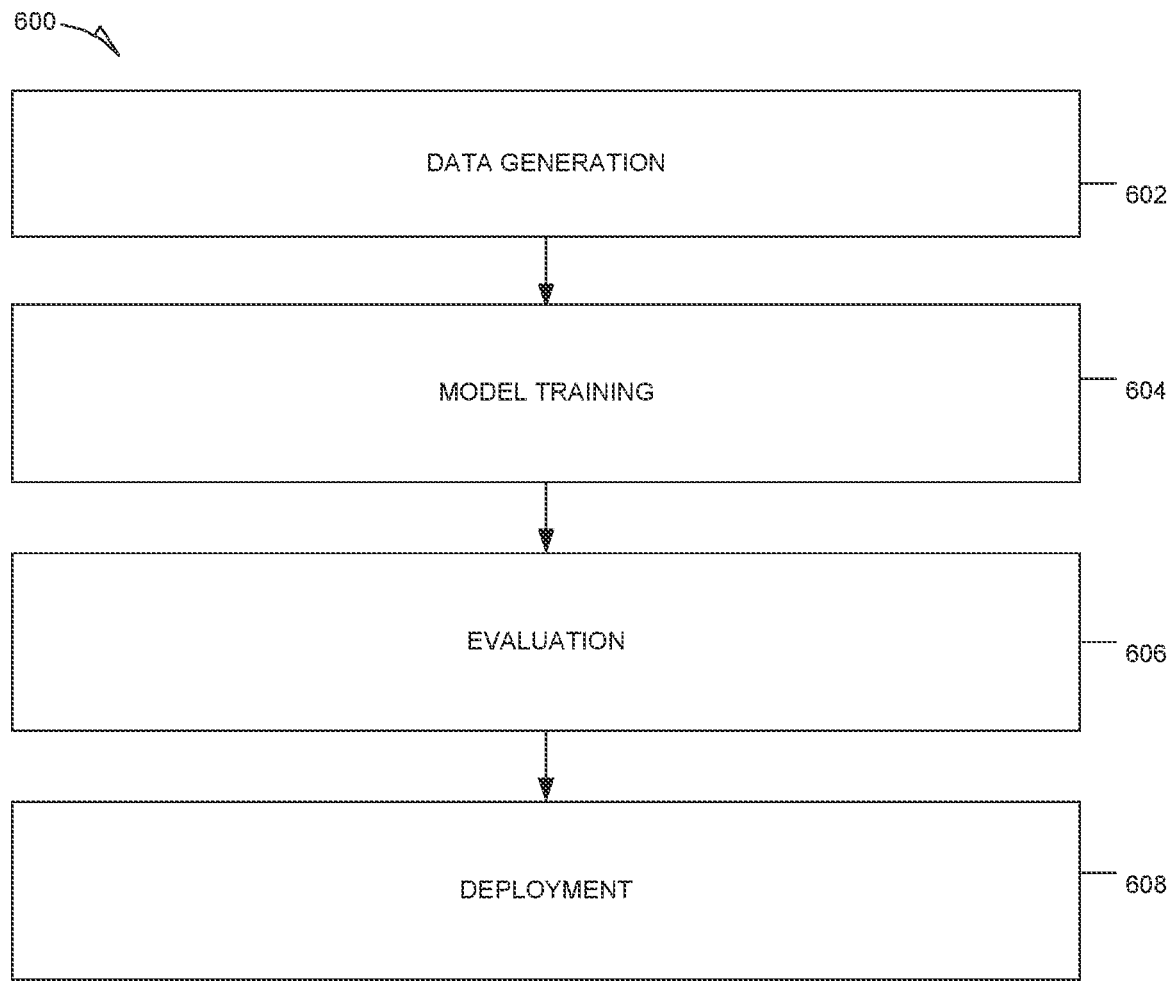
FIG. 6 is a block diagram showing how the system may evolve its summarization performance over time.

FIG. 6 is a block diagram illustrating an example training methodology 600 for the system to optimize its summarization performance over time. As described herein, the system can progress from basic to advanced functionality through built-in rules requiring minimal hand-tuning. In example embodiments, this functionality may be implemented by the learning capabilities of the content summarization services 120 shown in FIG. 1.

The services 120 initially include core modules like the abstraction parameter module 210, prompt engineering module 220, language model module 230, and retention module 240. The system can function at a basic level using just these modules or similar modules to, for example, accept client summarization requests, determine abstraction parameters, construct prompts, query LLMs, and/or return responses.

Over time, additional modules may be added or deployed modules may be reconfigured (e.g., automatically, through machine learning processes). For example, the external data module 250, dialog module 260, evaluation module 270, and training module 280 may be added. As these modules are deployed, the system gains more advanced capabilities.

The External Data Module 250 allows the system to interface with external data sources 130 to bring in supplemental information for summarization. For example, querying knowledge bases to augment an abstracted summary with key facts about entities mentioned. The module employs techniques like semantic searches and data retrievers to identify relevant external data sources for given summarization tasks. It may be added after initial deployment to increase contextual capabilities.

The Dialog Module 260 allows leveraging the core summarization capabilities to generate conversational responses via dialog systems and APIs. For instance, taking a summarized description of a customer support ticket and producing a natural language response addressing the key issues detected. The dialog module allows progressing from static summarization to interactive conversational applications.

The Evaluation Module 270 analyzes summarization outputs using metrics like semantic equivalence, redundancy, and human validation studies to quantify quality. Adding this module allows the system to begin autonomously evaluating the performance of different models and prompts to improve accuracy. The metrics help guide automatic selection of optimal models and prompts based on performance.

The Training Module 280 allows retraining the LLMs and other models on new data to improve summarization accuracy over time. It allows sample selection, data preprocessing, hyperparameter tuning, and model optimization. Adding this module allows the system to leverage new training data to automatically customize models for increased relevance to particular summarization tasks and domains.

These additional modules expand the capabilities of the initial architecture to enable more advanced summarization, dialog, transparency, evaluation, and training functionality. The modular design allows the system to automatically evolve its sophistication over time by deploying new modules.

Orchestrating Multiple LLMs & AI Modules

To evolve from basic to complex functionality, the system may leverage and combine multiple (e.g., third party) LLMs and AI modules. The system may employ a microservice approach with each model behind an API. This enables orchestrating model combinations.

The system can generate multiple candidate summaries using different models for the same prompt. An ensemble model compares the outputs and selects the best response based on consensus validation.

Modular sub-tasks like extraction, abstraction, and compression can be assigned to different specialized models. For instance, an extractive model identifies key sentences, then an abstractive model paraphrases them.

Models like classifiers, retrievers, and QA systems can be orchestrated to enhance summarization. For example, a classifier tags topics, then a retriever identifies relevant facts for those topics.

The system learns over time which model combinations produce optimal summaries for different use cases through testing and reinforcement learning.

These orchestration techniques allow the system to leverage an evolving ensemble of third party LLMs and AI technologies. The models themselves may be externally maintained (e.g., by partners) and continuously improved independently. But the system realizes its evolution by learning to combine and customize models for its specific summarization needs.

For example, as new LLMs like GPT-4 are released, the system can immediately leverage them through its modular architecture without internal model retraining. The new models are simply added behind the standard API, then the system learns how to best utilize the new capabilities. This constant integration of the latest external AI innovations fuels the system's own evolution.

Training Methodology

The training methodology in FIG. 6 describes how the system may evolve its summarization performance over time.

At operation 602, data is generated. For example, the training data includes large corpora for pretraining foundation models as well as domain-specific document/summary pairs for fine-tuning. In example embodiments, a data generation module may create datasets for training.

For pretraining, it may sample diverse documents from web crawl data, books, academic papers, news etc., as described herein. This develops the general capabilities of the LLMs.

For fine-tuning, it collects domain-specific corpora like legal contracts or scientific papers along with human-written abstracts as discussed in the Summarization section. This specializes models for particular tasks.

It employs techniques like cleaning, splitting, and augmentation to prepare the training data. The higher-quality and larger the datasets, the better the model performance.

At operation 604, one or more models are trained.

In example embodiments, a model training module fine-tunes the LLMs and other models on the training datasets as explained herein. The steps may include one or more of the following:

Selecting model architectures like BERT or GPT-3; The modular design allows integrating new architectures;

Using transfer learning to initialize with general pre-trained weights. This leverages external LLM advances;

Running supervised fine-tuning on domain documents to adapt to target vocabulary, writing style, and abstraction levels;

Optimizing hyperparameters like learning rate and dropout via grid search to maximize validation performance; and/or Repeating training iterations until overfitting is minimized and validation metrics plateau. New data enables further optimization.

By continuously training and fine-tuning models on new summarization data, the system can autonomously improve its performance over time.

At operation 806, evaluation is performed. For example, the evaluation module may analyze summarization outputs to guide model improvement as described herein. Techniques may include one or more of the following:

Calculating automated metrics like semantic similarity, conciseness, and grammar correctness to quantify quality;

Conducting human evaluation studies for subjective ratings on coherence, accuracy, and completeness;

Comparing metrics across model versions to determine performance improvements; New iterations are measured against baselines; and/or Using validation sets to detect overfitting. Model selection is based on real-world performance.

The evaluation metrics enable the system to scientifically track summarization gains over time and select optimal models.

At operation 808, one or more models are deployed.

This operation may include deploying top performing models into production summarization pipelines, while archiving past versions. As explained herein, containerization facilitates smooth model deployment and rollbacks. Canary testing releases new models to a subset of users first. Blue-green deployment shifts traffic seamlessly to new models once validated. Monitoring continues post-deployment to detect potential regressions.

By iteratively generating training data, optimizing models, evaluating outputs, and deploying top performers, the system can automatically improve its summarization accuracy over time.

Example Mobile Device

Figure 7:
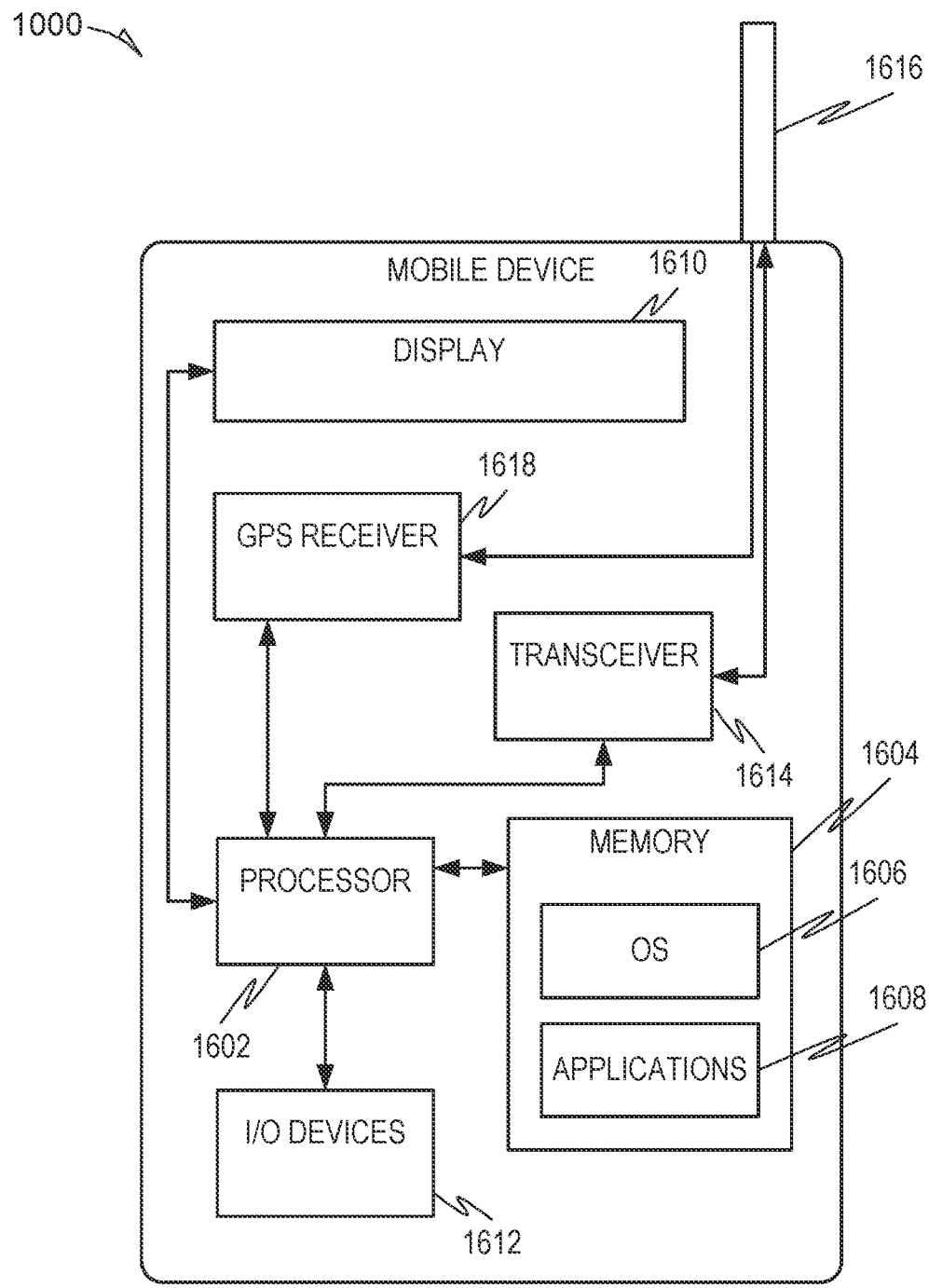
FIG. 7 is a block diagram illustrating a mobile device, according to an example embodiment.

FIG. 7 is a block diagram illustrating a mobile device 1000, according to an example embodiment. The mobile device 1000 can include a processor 1602. The processor 1602 can be any of a variety of different types of commercially available processors suitable for mobile devices 1000 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location-enabled application that can provide location-based services (LBSs) to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 1000. Further, in some configurations, a GPS receiver 1618 can also make use of the antenna 1616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In various example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
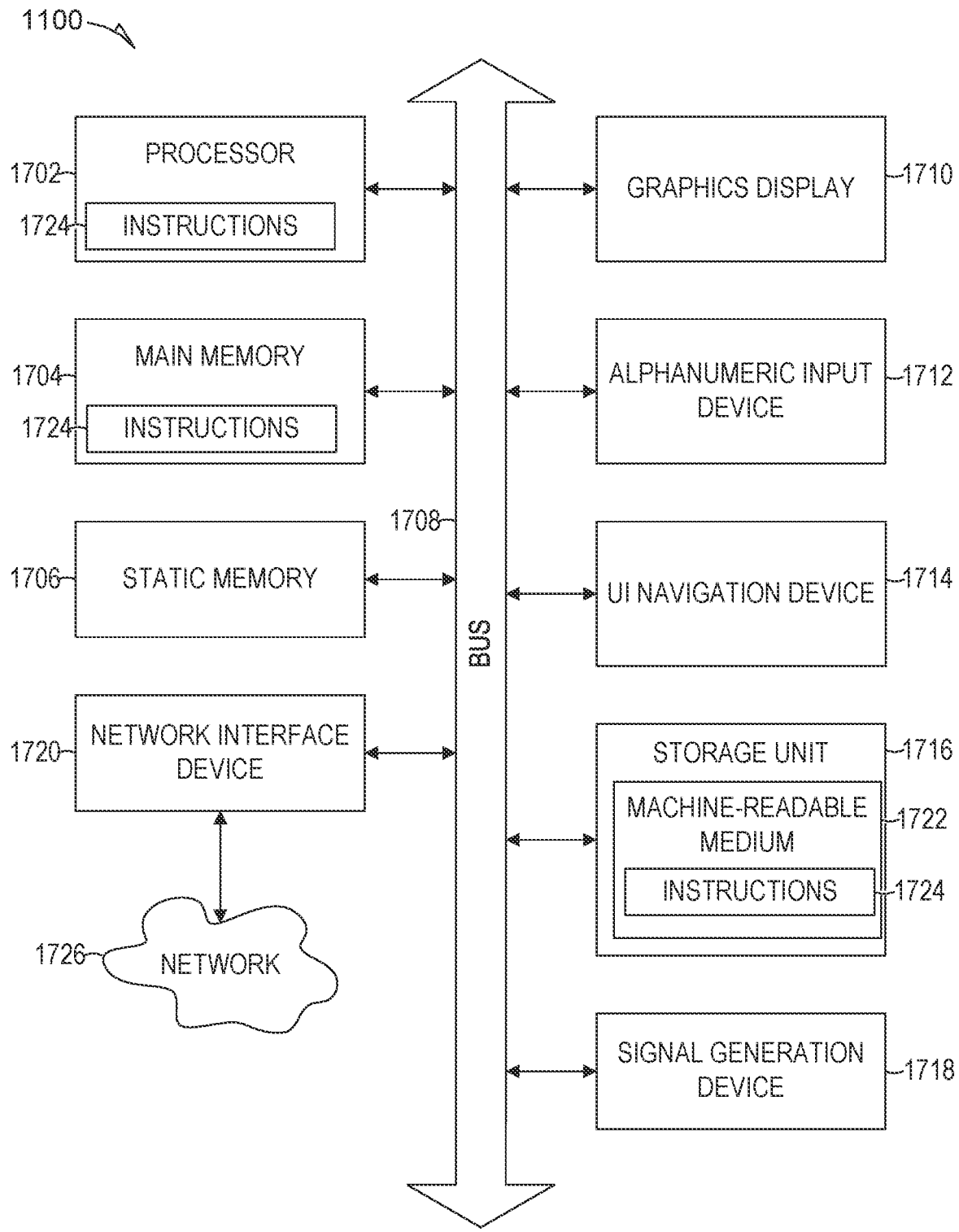
FIG. 8 is a block diagram of machine in the example form of a computer system within which instructions for causing the machine to perform any one or more of the methodologies discussed herein may be executed.

FIG. 8 is a block diagram of an example computer system 1100 on which methodologies and operations described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1702 (e.g., a central processing unit (CPU), a graphics processing unit (GPU) or both), a main memory 1704 and a static memory 1706, which communicate with each other via a bus 1708. The computer system 1100 may further include a graphics display unit 1710 (e.g., a liquid crystal display (LCD) or a cathode ray tube (CRT)). The computer system 1100 also includes an alphanumeric input device 1712 (e.g., a keyboard or a touch-sensitive display screen), a user interface (UI) navigation device 1714 (e.g., a mouse), a storage unit 1716, a signal generation device 1718 (e.g., a speaker) and a network interface device 1720.

Machine-Readable Medium

The storage unit 1716 includes a machine-readable medium 1722 on which is stored one or more sets of instructions and data structures (e.g., software) 1724 embodying or utilized by any one or more of the methodologies, operations, or functions described herein. The instructions 1724 may also reside, completely or at least partially, within the main memory 1704 and/or within the processor 1702 during execution thereof by the computer system 1100, the main memory 1704 and the processor 1702 also constituting machine-readable media.

While the machine-readable medium 1722 is shown in an example embodiment to be a single medium, the term "machine-readable medium" may include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions (e.g., instructions 1724) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more computer-implemented subsystems, the one or more computer-implemented subsystems configured to perform operations, the operations comprising:
   identifying a first content item, the first content item including a set of sub-content items;
   determining a level of abstraction for the first content item;
   automatically engineering a prompt for providing to a large language model (LLM), the prompt including a reference to the first content item and the level of the abstraction for the first content item;
   receiving a response to the prompt from the LLM, the response including a second content item, the second content item including a representation of the first content item that is generated by the LLM, the representation omitting or simplifying one or more of the set of sub-content items based on the level of abstraction; and
   using the representation to control an output that is communicated to a target device.

2. The system of claim 1, wherein the level of the abstraction is specified as a percentage of a measurement pertaining to the first content item that is to be used by the LLM to limit a corresponding measurement of the representation.

3. The system of claim 2, wherein the measurement pertaining to the first content item relates to a length or size of the first content item and the corresponding measurement of the representation relates to a length or size of the representation.

4. The system of claim 1, wherein the determining of the level of the abstraction is based on an input received from a user via a graphical user interface.

5. The system of claim 1, the operations further comprising, based on the level of abstraction transgressing a configurable threshold value, further engineering the prompt to request that the LLM make one or more inferences based on the first content item and to generate information pertaining to the one or more inferences for including in the representation.

6. The system of claim 5, the operations further comprising, further engineering the prompt to request that the LLM use one or more external data sources to generate the information pertaining the one or more inferences.

7. The system of claim 1, wherein the using of the representation includes engineering an additional prompt to the LLM, the additional prompt requesting the LLM to generate an appropriate conversational response to the representation based on a context associated with the representation and an entity represented by the system.

8. The system of claim 7, wherein the entity is a sales representative and the context includes information pertaining to a sales call being handled in real time by the sales representative.

9. The system of claim 8, wherein the sub-content items include one or more statements made by a customer and one or more statement made by the sales representative.

10. The system of claim 9, wherein the sales representative is an intelligent agent.

11. A method comprising:
    identifying a first content item, the first content item including a set of sub-content items;
    determining a level of abstraction for the first content item;
    automatically engineering a prompt for providing to a large language model (LLM), the prompt including a reference to the first content item and the level of the abstraction for the first content item;
    receiving a response to the prompt from the LLM, the response including a second content item, the second content item including a representation of the first content item that is generated by the LLM, the representation omitting or simplifying one or more of the set of sub-content items based on the level of abstraction; and
    using the representation to control an output that is communicated to a target device.

12. The method of claim 11, further comprising, based on the level of abstraction transgressing a configurable threshold value, further engineering the prompt to request that the LLM make one or more inferences based on the first content item and to generate information pertaining to the one or more inferences for including in the representation.

13. The method of claim 12, further comprising further engineering the prompt to request that the LLM use one or more external data sources to generate the information pertaining the one or more inferences.

14. The method of claim 11, wherein the using of the representation includes engineering an additional prompt to the LLM, the additional prompt requesting the LLM to generate an appropriate conversational response to the representation based on a context associated with the representation and an entity represented by a system.

15. The method of claim 14, wherein the entity is a sales representative and the context includes information pertaining to a sales call being handled in real time by the sales representative.

16. A non-transitory computer-readable storage medium storing a set of instructions that, when executed by one or more computer processors, causes the one or more computer processors to perform operations, the operations comprising:
    identifying a first content item, the first content item including a set of sub-content items;
    determining a level of abstraction for the first content item;
    automatically engineering a prompt for providing to a large language model (LLM), the prompt including a reference to the first content item and the level of the abstraction for the first content item;
    receiving a response to the prompt from the LLM, the response including a second content item, the second content item including a representation of the first content item that is generated by the LLM, the representation omitting or simplifying one or more of the set of sub-content items based on the level of abstraction; and using the representation to control an output that is communicated to a target device.

17. The non-transitory computer-readable storage medium of claim 16, the operations further comprising, based on the level of abstraction transgressing a configurable threshold value, further engineering the prompt to request that the LLM make one or more inferences based on the first content item and to generate information pertaining to the one or more inferences for including in the representation.

18. The non-transitory computer-readable storage medium of claim 17, the operations further comprising further engineering the prompt to request that the LLM use one or more external data sources to generate the information pertaining the one or more inferences.

19. The non-transitory computer-readable storage medium of claim 16, wherein the using of the representation includes engineering an additional prompt to the LLM, the additional prompt requesting the LLM to generate an appropriate conversational response to the representation based on a context associated with the representation and an entity represented by a system.

20. The non-transitory computer-readable storage medium of claim 19, wherein the entity is a sales representative and the context includes information pertaining to a sales call being handled in real time by the sales representative.

* * * * *

UNITED STATES PATENT AND TRADEMARK OFFICE
CERTIFICATE OF CORRECTION

PATENT NO. : 12,008,332 B1  
APPLICATION NO. : 18/452496  
DATED : June 11, 2024  
INVENTOR(S) : Gardner et al.

Page 1 of 1

It is certified that error appears in the above-identified patent and that said Letters Patent is hereby corrected as shown below:

On the Title Page

On page 2, in Column 1, under item (56) "Other Publications", Line 4, delete "Sununarize" and insert --Summarize-- therefor On page 2, in Column 1, under item (56) "Other Publications", Line 11, delete "Sununarization:" and insert --Summarization:-- therefor Signed and Sealed this  
Tenth Day of June, 2025

Coke Morgan Stewart  
*Acting Director of the United States Patent and Trademark Office*